March 19, 1957 G. W. DUNHAM 2,785,701
LOOMS
Filed Jan. 26, 1952 11 Sheets-Sheet 1
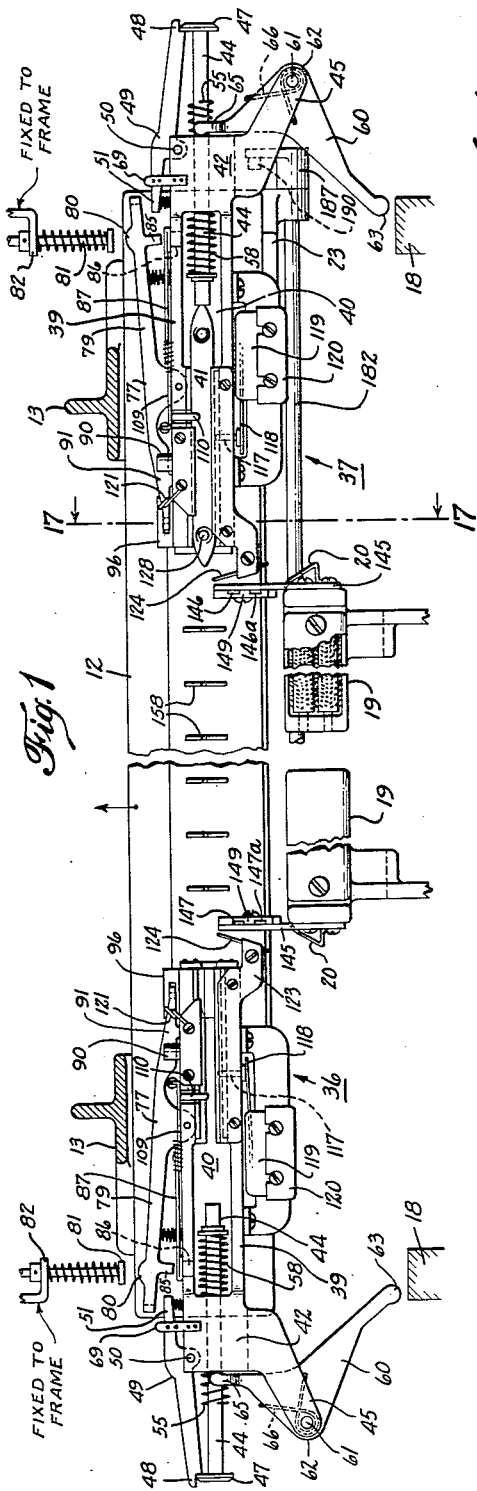
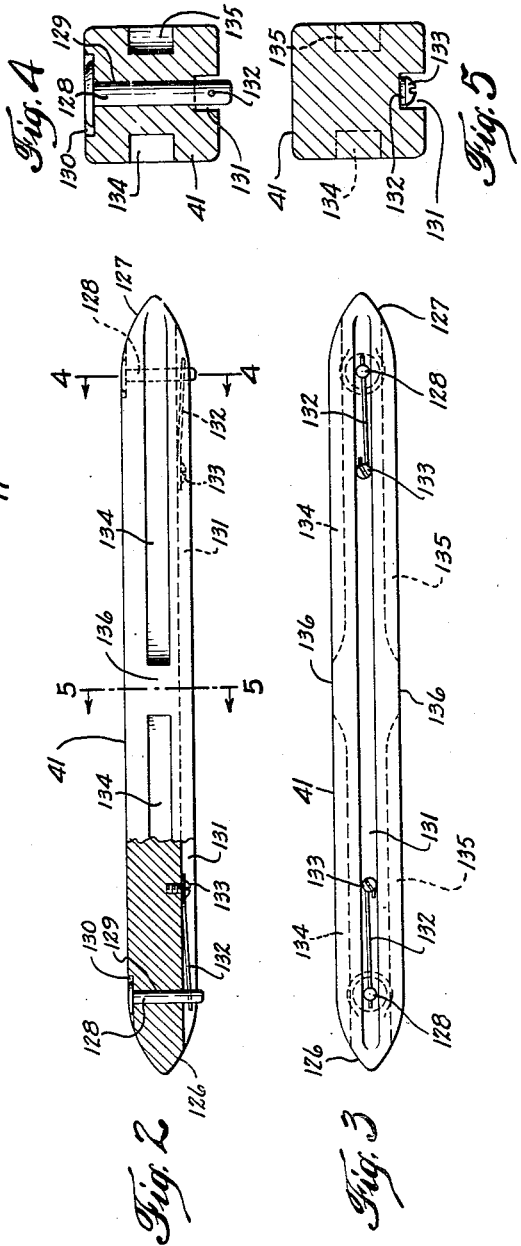
INVENTOR.
GEORGE W. DUNHAM
BY
Austin, Dicke, Wilhelm + Padlon
ATTORNEYS

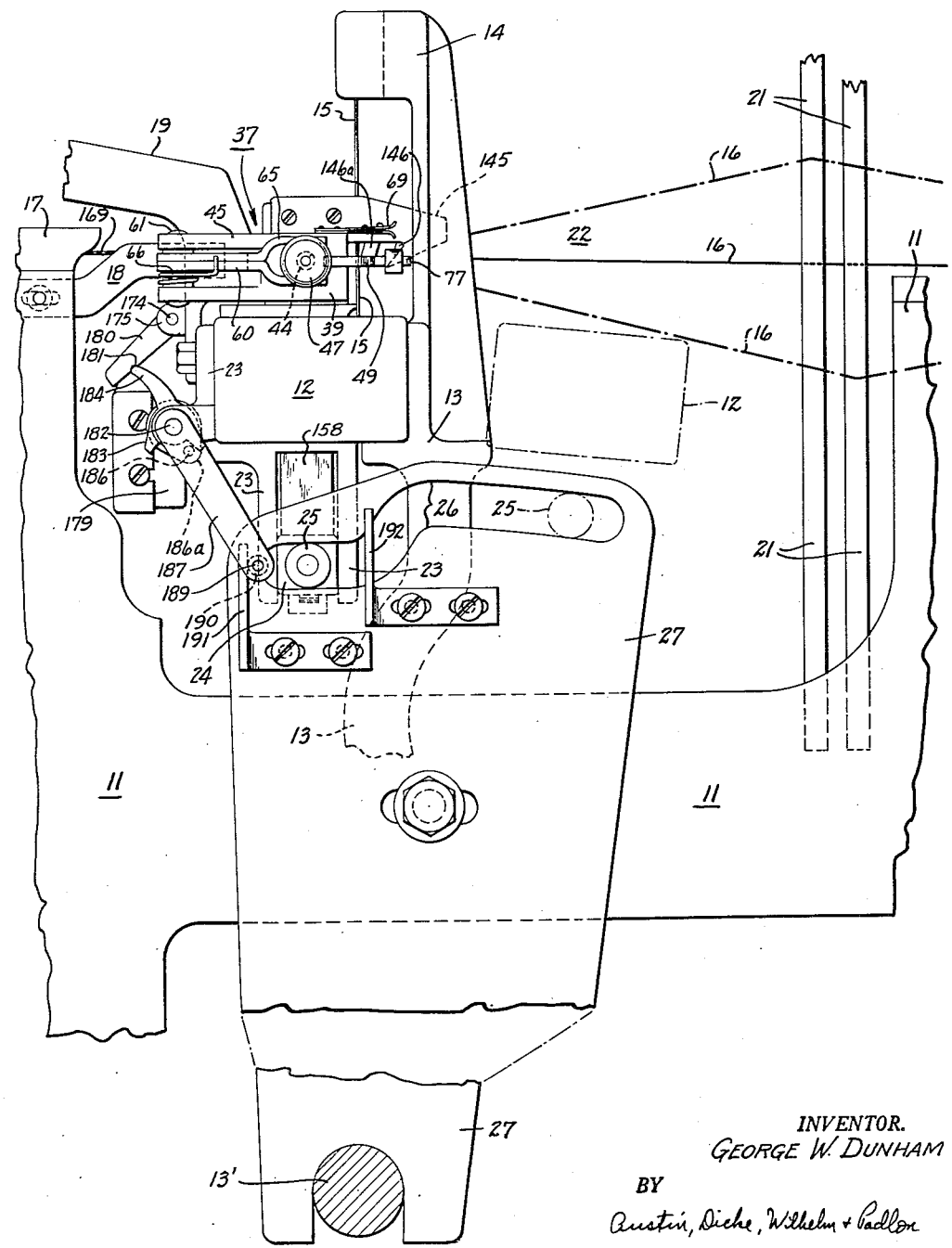

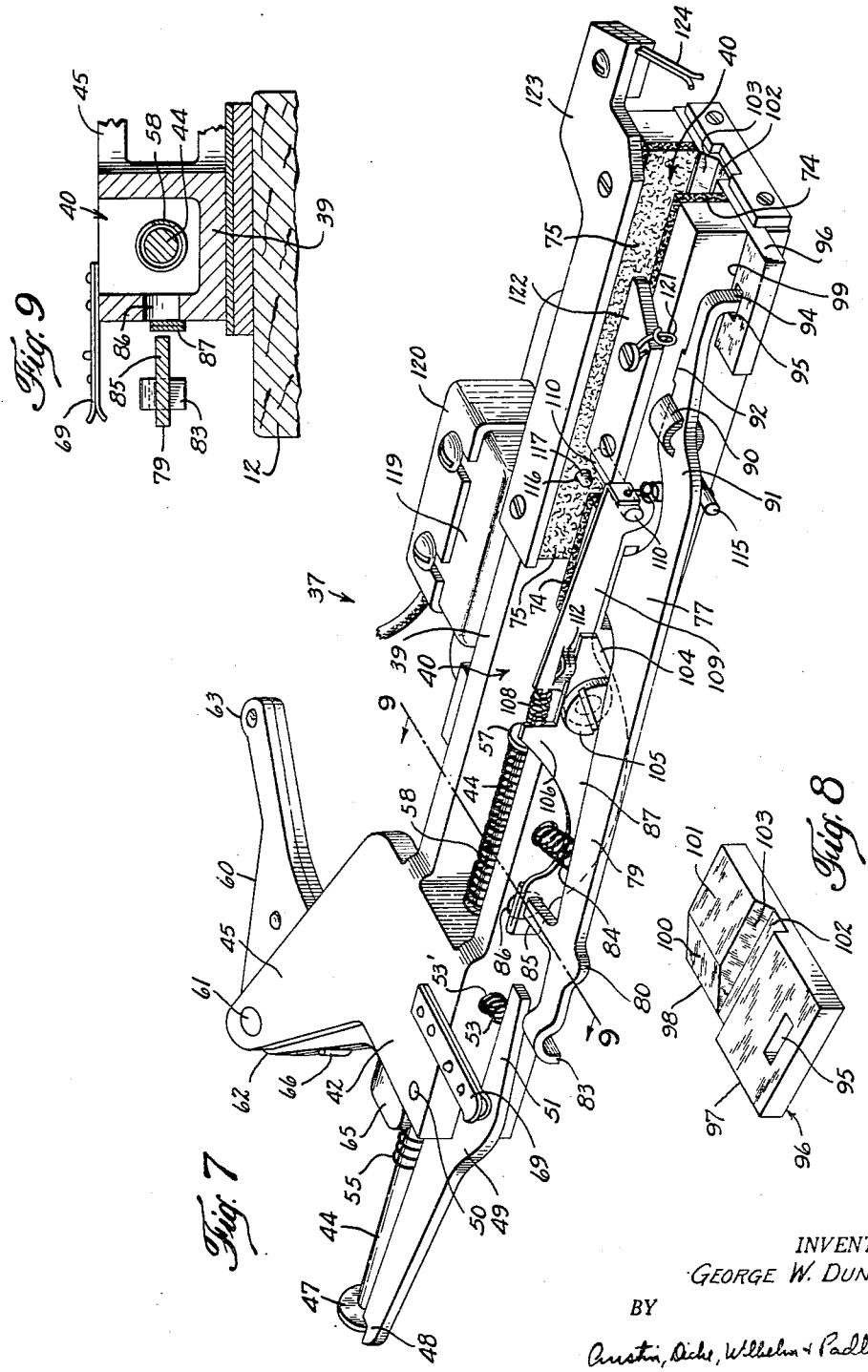

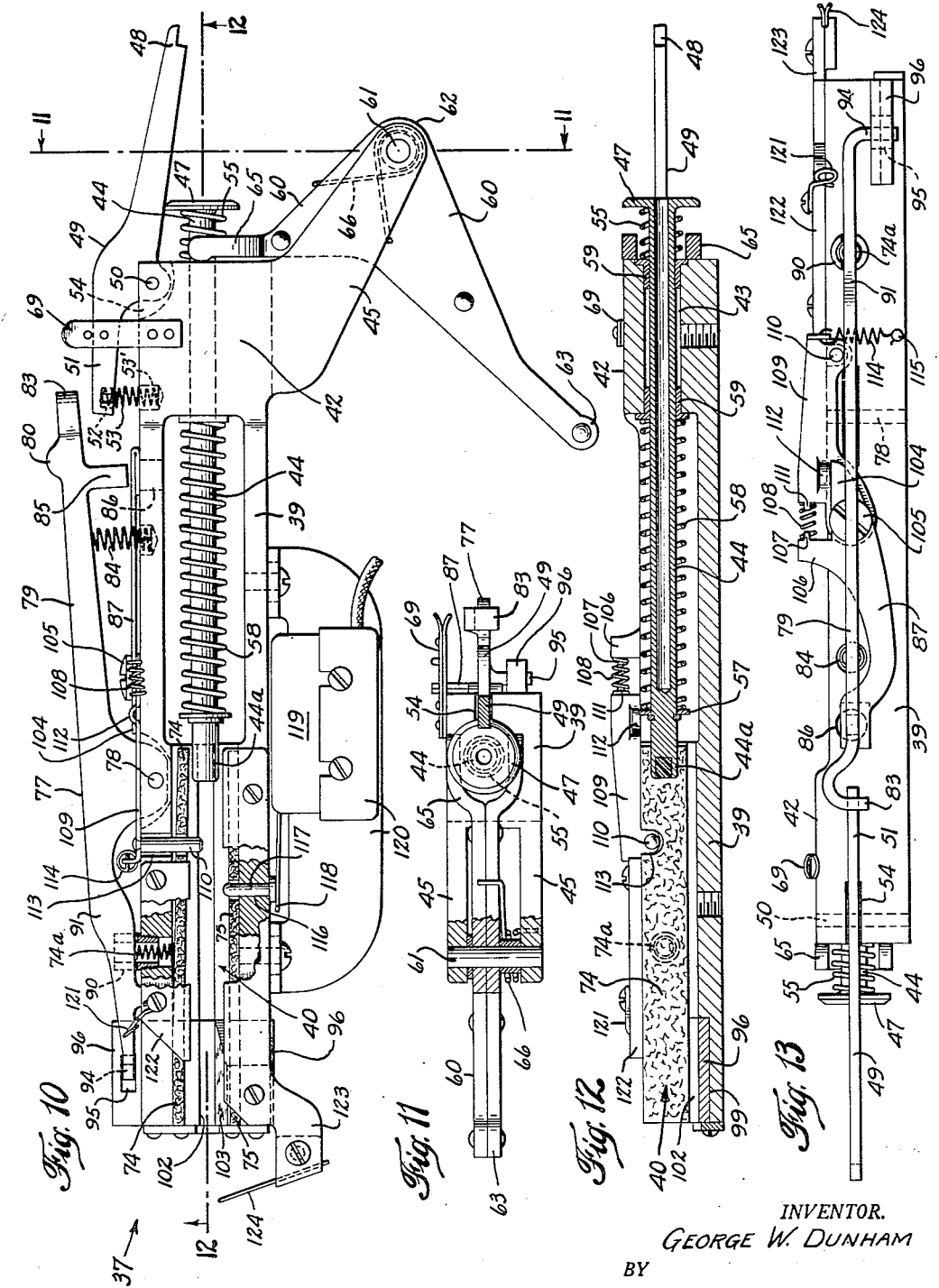

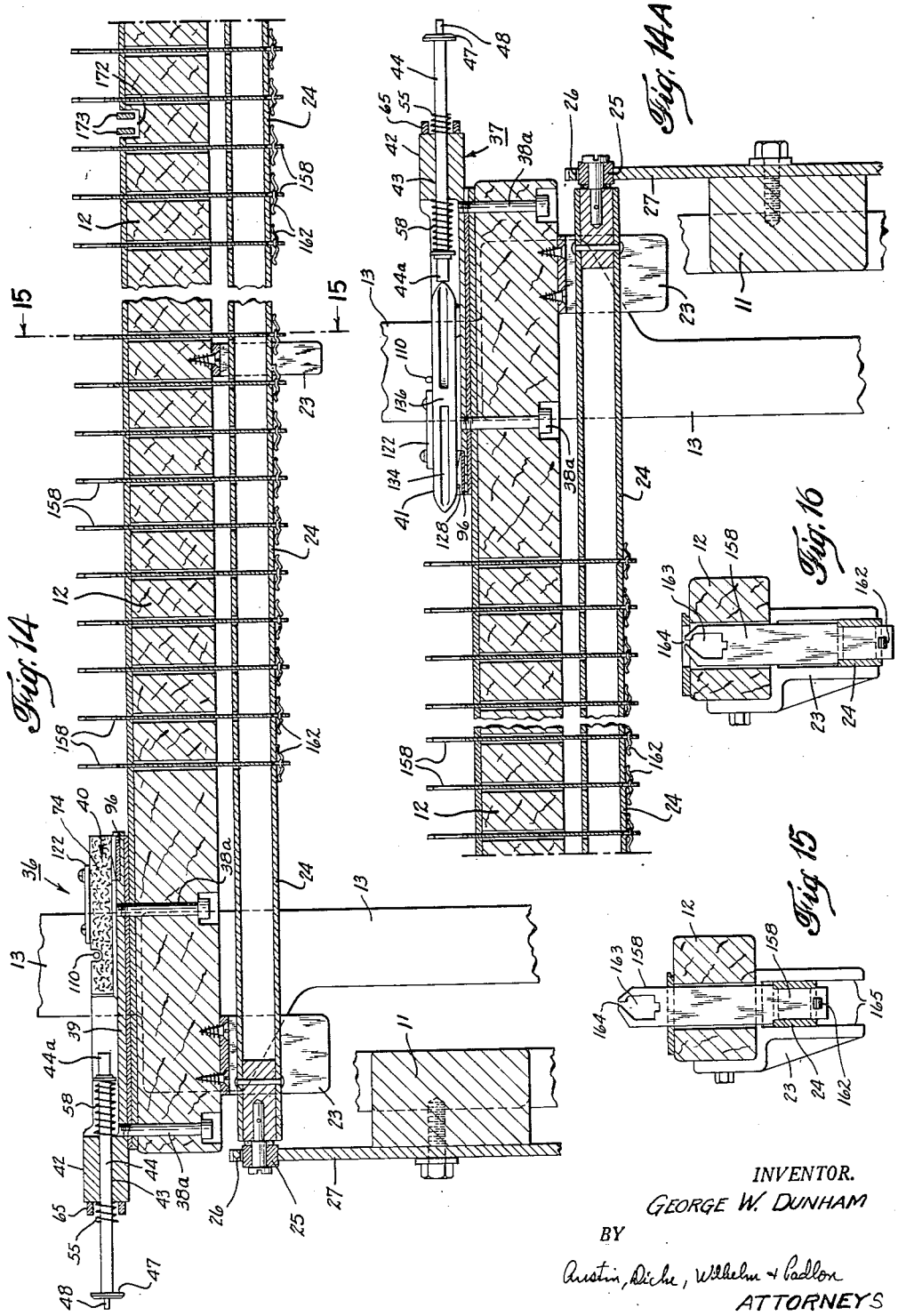

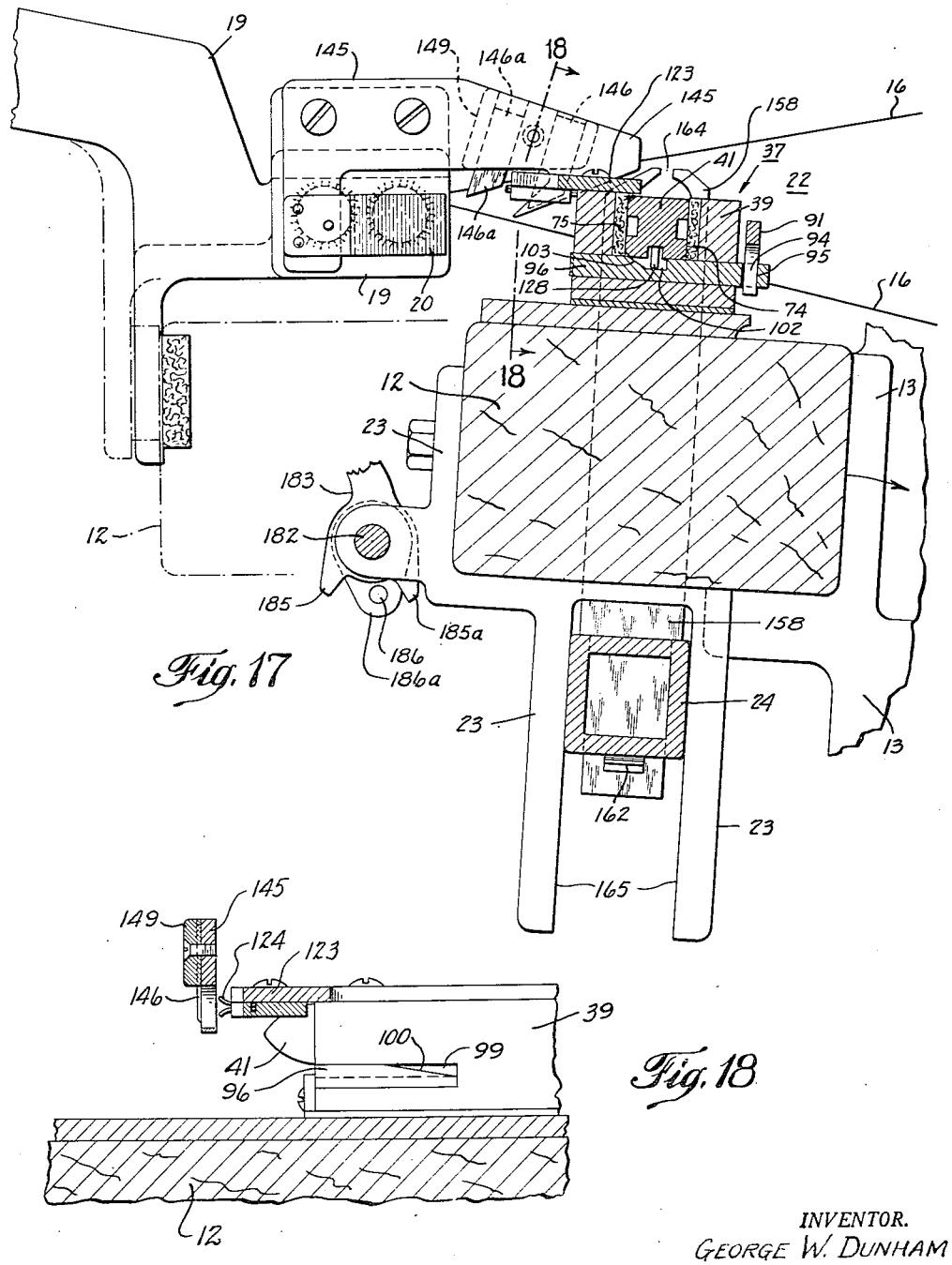

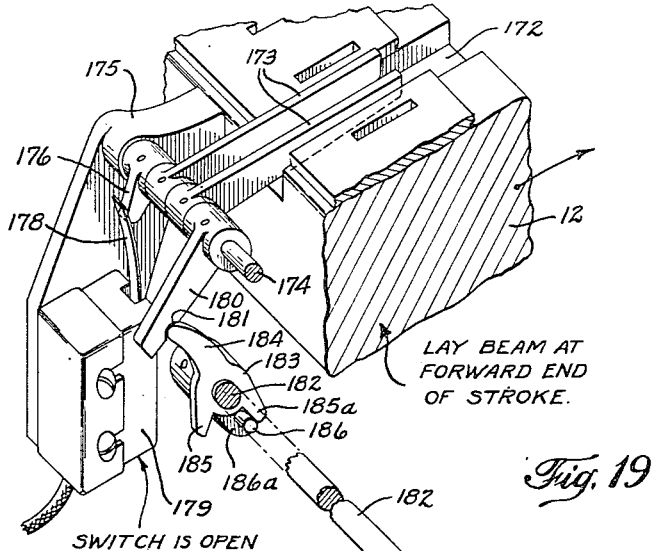
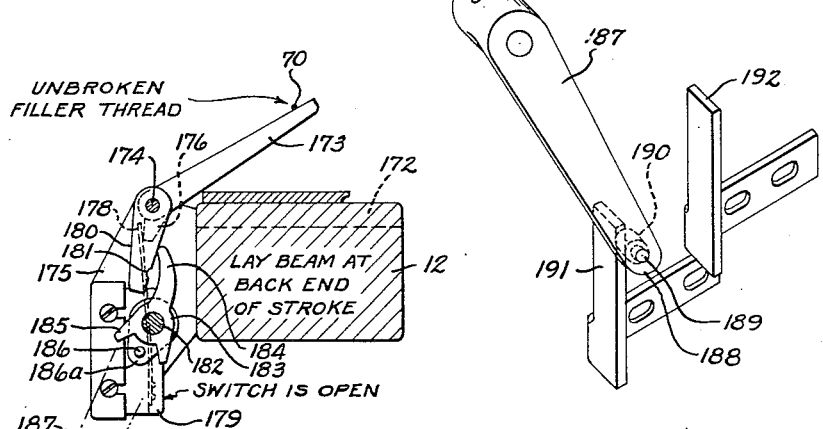
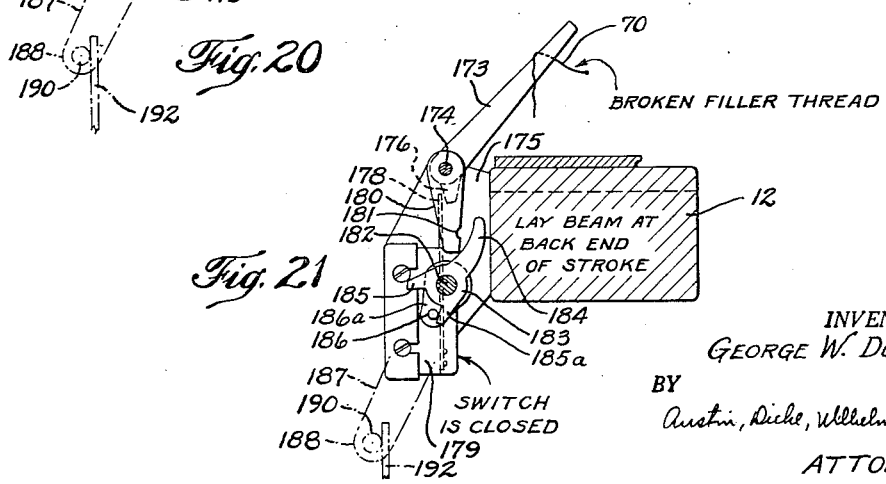

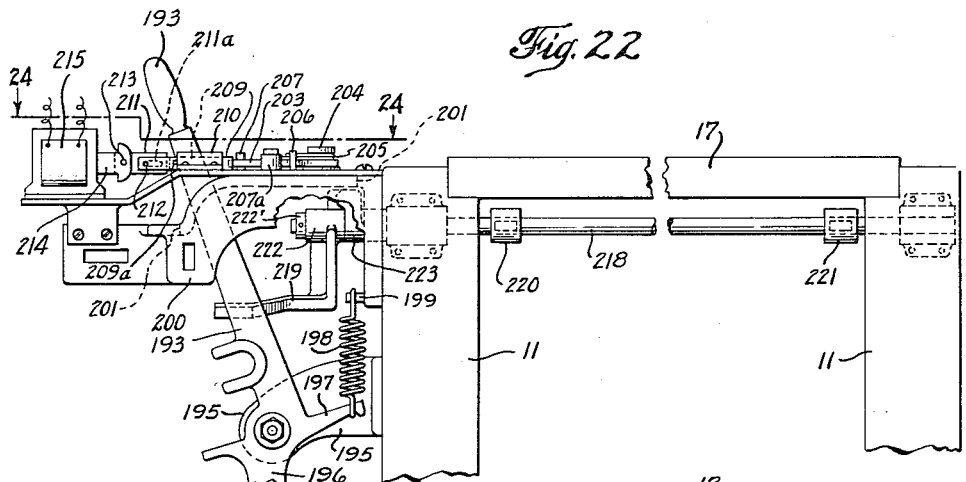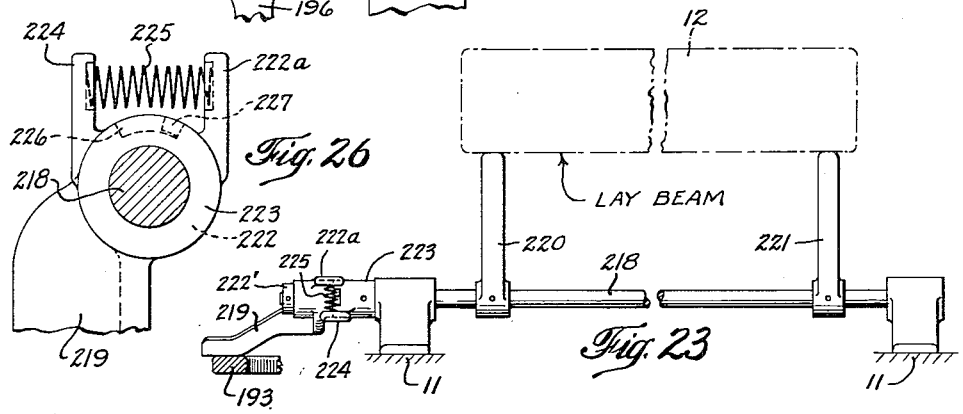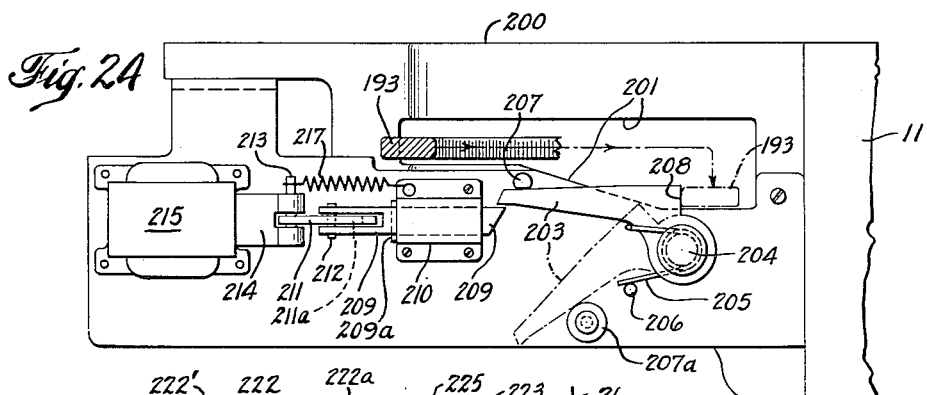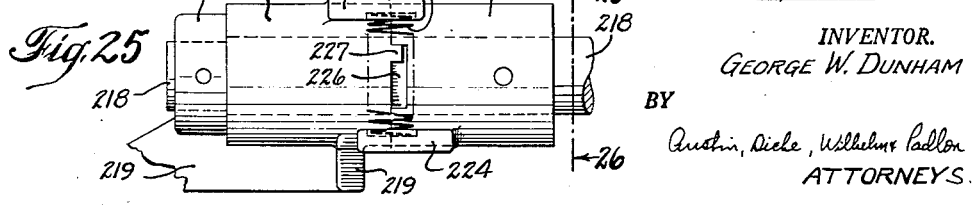

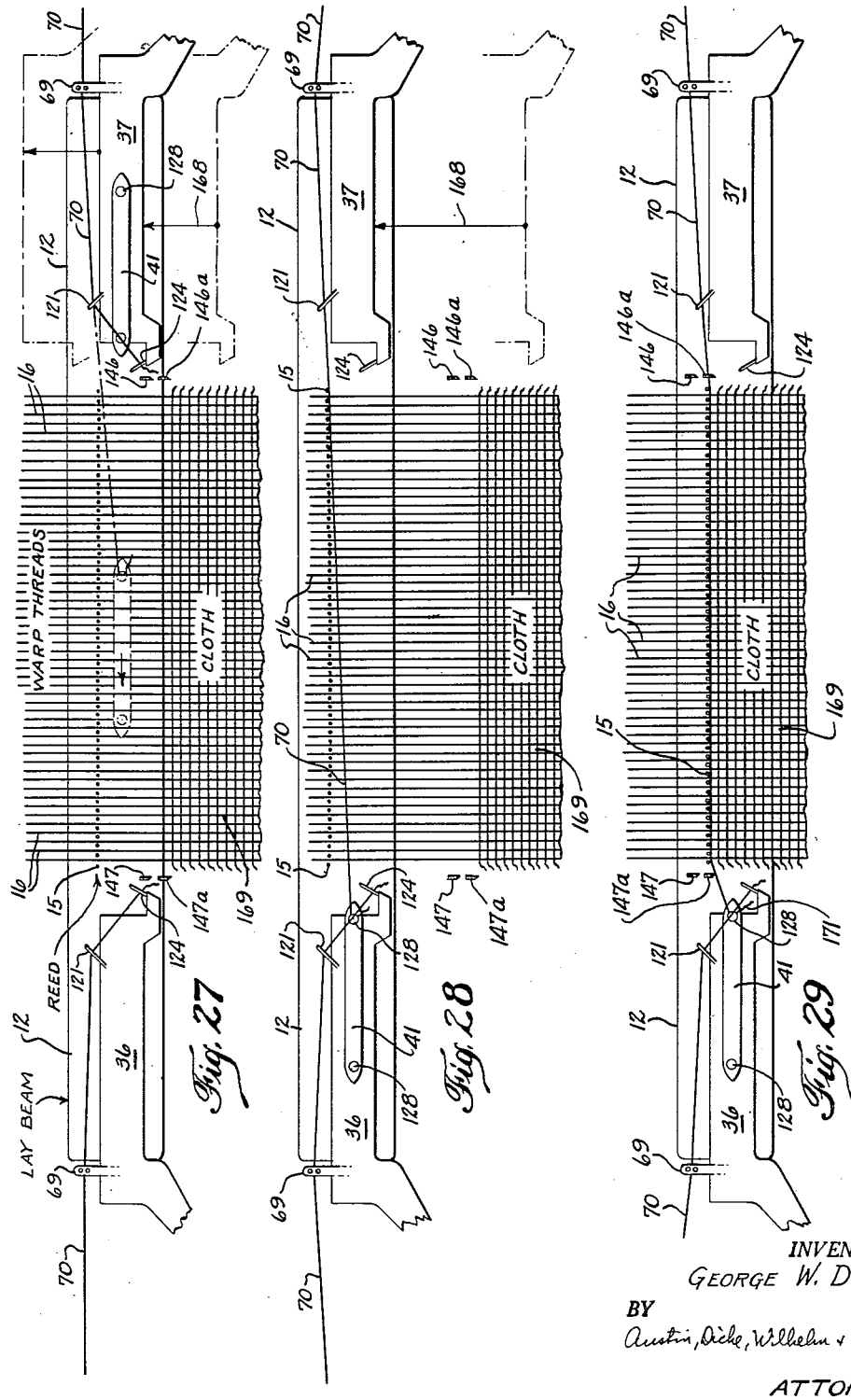

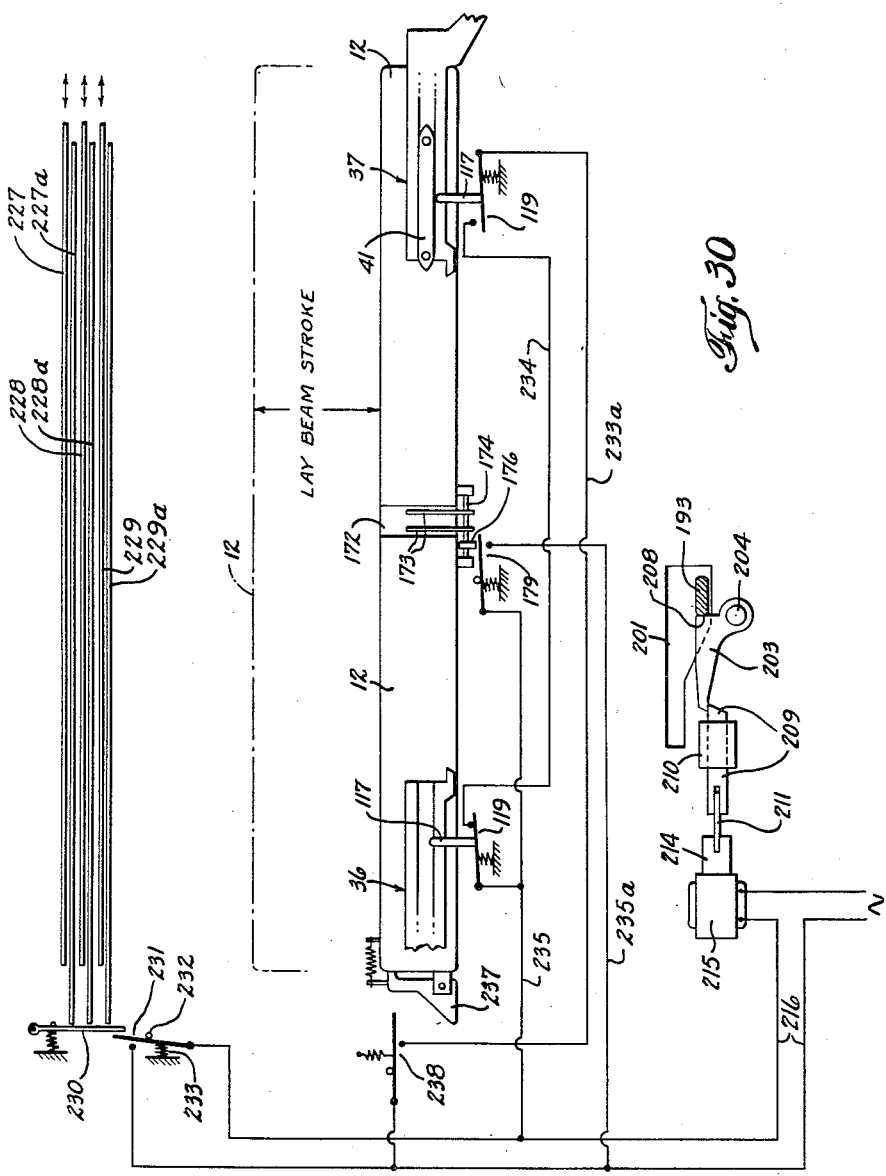

March 19, 1957 G. W. DUNHAM 2,785,701
LOOMS
Filed Jan. 26, 1952 11 Sheets-Sheet 11
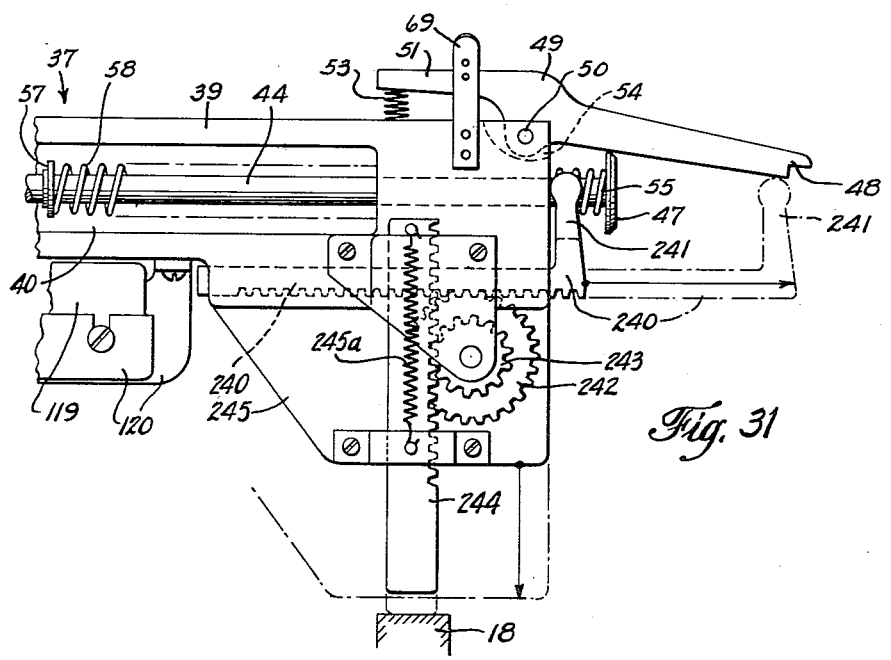
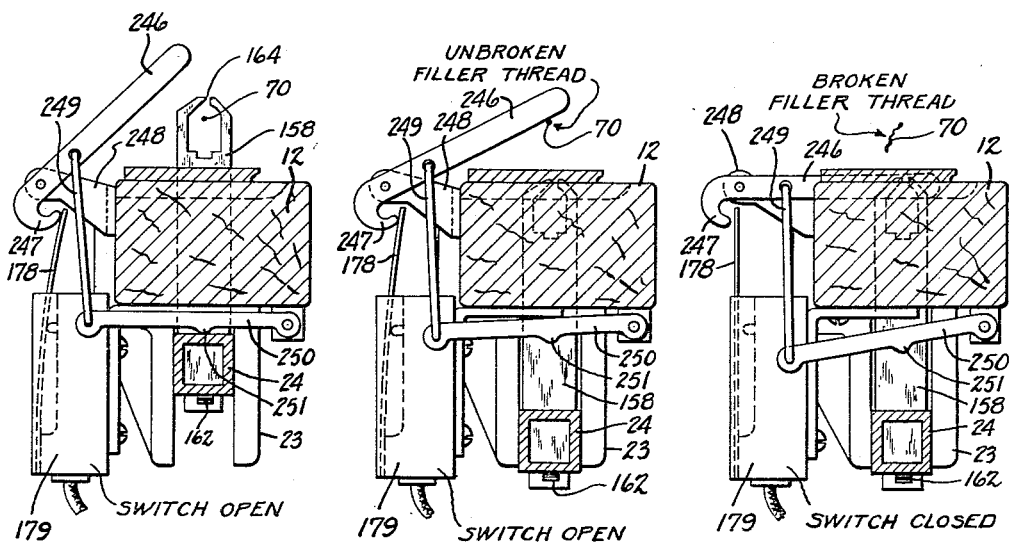
INVENTOR.
GEORGE W. DUNHAM
BY
Austin, Dicke, Wilhelm & Padlon
ATTORNEYS

United States Patent Office 2,785,701
Patented Mar. 19, 1957

2,785,701
LOOMS
George W. Dunham, Westport, Conn.

Application January 26, 1952, Serial No. 268,418

60 Claims. (Cl. 139—126)

This invention relates to looms and more particularly to a loom with a weaving free flying pilot or shuttle for carrying the filler thread or weft across the loom, operating means therefor and associated safety means controlling the operation of the loom.

In looms heretofore made and used, the weaver or operator of such looms is confronted with the problem of increasing the efficiency and rapidity of movement of the weft or filler thread through the shed forming the resultant woven cloth.

By my invention I provide a loom in which the filler thread is projected through the shed of warp thread to form the woven cloth under properly and safely controlled operating conditions in the loom.

With the foregoing in view, it is an object of the present invention to provide means for projecting a flying pilot in a loom to effect cross-weaving of textiles on said loom.

Another object of the present invention is to provide operable means for carrying filler threads under controlled conditions across the warp in a loom during weaving of cloths and textiles.

Still another object of the present invention is to provide synchronized means for guiding operable filler thread carrying means to facilitate the weaving of a cloth and other fabrics.

Another object of the present invention is to provide means for directly weaving fabrics from a cone thereby eliminating the necessity of winding bobbins and of feeding them into the shuttle as heretofore used.

It is a further object of the present invention to provide associated safety control means cooperating with a loom for automatically stopping the operation of the loom if during the weaving operation any of the threads are broken.

Another object of my invention is to provide means associated with projecting means for regulating the operation of cross weaving pilot means carrying a filler thread during such operation.

Still another object of the present invention is to provide an electrical circuit system for controlling the operation of the loom during weaving of cloth therein.

Other objects and features of the invention will become apparent from the following detailed description taken in conjunction with the accompanying drawing, in which:

Fig. 1 is a fragmental, partially detailed plan view of parts of a loom including my invention, said view showing the laybeam in the loom in mid position of its complete swing;

Fig. 2 is a longitudinal side, partly sectional view of a filler thread carrying pilot, said pilot being projected to and fro the right and left of Fig. 1;

Fig. 3 is a bottom view of the pilot shown in Fig. 2;

Fig. 4 and Fig. 5 are sectional views taken on lines 4—4 and 5—5 respectively of Fig. 2;

Fig. 6 is an elevational view showing the forward position of the laybeam and parts thereof as seen from the right of Fig. 1;

Fig. 7 is a detail perspective view of the right hand projecting unit, of Fig. 1 and the operative controlling mechanism thereof turned about and seen from a position at the rear of the loom; the left hand unit in Fig. 1 is a mirror image of the right hand unit;

Fig. 8 is a perspective view of a cam plate member forming part of the unit shown in Fig. 7;

Fig. 9 is a sectional view taken on line 9—9 of Fig. 7;

Fig. 10 is a top plan view of the right hand projector unit shown in Fig. 1, removed from the supporting laybeam;

Fig. 11 is an end view taken on line 11—11 of Fig. 10;

Fig. 12 is a central, longitudinal sectional view taken on line 12—12 of Fig. 10;

Fig. 13 is an elevation of the rear side of the unit shown in Fig. 10;

Fig. 14 is a fragmental central vertical sectional view of the left portion of Fig. 1 showing the pilot guides in the laybeam between the projector units;

Fig. 14A is a similar but right end sectional view of Fig. 1 and is a continuation of Fig. 14;

Fig. 15 is a sectional detail view taken on line 15—15 of Fig. 14 showing the pilot guides in upper-most position from the laybeam;

Fig. 16 is a view similar to Fig. 15 showing the guides in lower position with respect to the laybeam;

Fig. 17 is a fragmental cross sectional view and is taken on line 17—17 of Fig. 1;

Fig. 18 is a fragmental sectional view taken along line 18—18 of Fig. 17 and showing a portion of the projector unit, knives and laybeam, as shown in Fig. 1;

Fig. 19 is a fragmentary perspective view of the central portion of the laybeam showing the arrangement of thread feeler fingers and their actuating means, the latter being shown for greater clarity as dissected from the surrounding conventional loom framework.

Fig. 20 and Fig. 21 respectively, are cross sectional views showing the control operation of different positions in the arrangement in Fig. 19;

Fig. 22 is a front, fragmental view of a portion of the frame in Fig. 1 showing the master or shipper handle and controls therefor for the loom;

Fig. 23 is a fragmental, schematic plan view showing the cooperation of the master or shipper handle shown in Fig. 22 and the daggers in the loom and their control of the laybeam;

Fig. 24 is a plan view taken on line 24—24 of the left end of Fig. 22;

Fig. 25 is a detail plan view of a portion of the coupling collar arrangement, shown in Fig. 23;

Fig. 26 is a sectional end view taken on line 26—26 of Fig. 25;

Fig. 27 is a plan view diagrammatically showing the direction of travel of the pilot carrying a filler thread through the shed of the warp threads in the loom and the movement of the laybeam;

Fig. 28 is a view similar to Fig. 27 showing the pilot past the shed and in receiving position in the receiving projector unit while the laybeam is in back position;

Fig. 29 is a view similar to Fig. 28, showing the reed pressing the filler thread into position against the cloth and the filler thread attached to the pilot about to be cut at both edges of the cloth. These two cutting operations are performed as the laybeam moves backward.

Fig. 30 is a schematic or diagrammatic view of the electrical circuit and means forming part of the invention used in controlling the safe operation of the loom;

Fig. 31 is a fragmental plan view of a modification of a portion of the tensioning or cocking means for the projection units shown on the ends of the laybeam in Fig. 1;

Figs. 32, 33, and 34, respectively, show details of a modified form of thread filler fingers and their respective positions and operation.

Referring now to the drawings in which like reference characters refer to like parts throughout, it will be noted that my invention is part of and an improvement over the conventional type of a loom generally found in the art and has the conventional type of frame such as shown in Figs. 1, 6, 14, 14a, 17 and 22 of the drawings.

In such conventional type of loom, there are provided side frames 11 between which, as shown in Fig. 6, there is a laybeam 12 carried by upwardly extending swords 13, one at each end of the beam. Said swords are each pivoted to oscillate about a shaft 13' fixed in the lower part of the frames 11. Said swords and laybeam are operated as a unit in the conventional manner by the usual drive and operating means, such as by wheels, gears and cranks, not shown.

Each of the swords, as shown, has a forwardly extending upper portion 14 for reed assembly 15 comprising spaced parallel wires to keep the warp threads 16 separate during the weaving operation, and to beat the filling into the cloth.

The front of the loom is provided with a breastbeam 17 (Fig. 6) from which extend adjustable stop members 18. In addition, there is also included near each end of laybeam 12 a pin roller temple 19 (Figs. 1, 6 and 17) through which passes the resultant woven cloth 169 before it is rolled into a bolt. Said temple is of the conventional type and has a cover plate, as shown, in which are a plurality of rollers with means extending from their periphery for holding the woven cloth taut laterally before rolling it into a bolt. Each temple, furthermore, is provided with a pilot spring cam 20 which assures the seating of the pilot against the plunger 44, if necessary, and whose purpose will be hereinafter described. The temple is resiliently mounted in a conventional manner and acts as a shock absorber for the laybeam. The temple is set in relation to the laybeam to take up any of its impacts at the end of its forward stroke during the operation of the loom.

Behind reed assembly 15 there are harnesses 21 by which the warp threads 16 are manipulated to relatively different but taut positions to form sheds, such as the shed 22, as shown.

The laybeam 12, as shown in Figs. 6, and 14 to 17, is provided at each end and at intermediate points with brackets 23 having a space for accommodating a square bar 24 therein. Said bar is provided at each end with a roller 25 adapted to ride in a slot 26 in cam plates 27 adjustably fixed to sides 11 of the loom by the screws 28. As the laybeam swings back and forth during the operation of the loom, said bar reciprocates in the brackets 23. The square bar, as shown in Fig. 6, is in its forward and lower position, and the rollers thereon move along the cam slot 26 whereby as the laybeam moves to back position, as shown, the bar rises in the brackets.

In accordance with my invention a loom is provided with a pair of shuttle or pilot projecting units 36 and 37 respectively. Said units are mounted one at each end of laybeam 12 and are fixed thereto as shown in Fig. 14 and Fig. 14A by the machine screws 38a. Since these projecting units 36 and 37 are similar in construction except that one is the opposite hand or mirror image to the other, it will be necessary only to describe one using corresponding numbers for each part thereof. The units are shown more clearly in Figs. 1, 7 and 10 to 13 inclusive. Each unit has a base 39 fixed to the laybeam and is provided with a relatively long channel 40 which is adapted to accommodate and receive a flying shuttle or pilot 41 as shown more clearly in Figs. 2 to 5 inclusive. Said base 39 has a head or rear body portion 42 containing an opening 43 leading from pilot-receiving channel 40 and through which extends an axially slidable plunger 44. Also, said head 42 has a bifurcated outward projection 45 between the forks of which a cocking lever 60 is pivotally mounted.

Plunger 44 is provided at one end with a head flange 47 for contacting the notched end 48 of arm or trigger 49 which member is pivotally mounted by means of pin 50 to said base member as shown.

Plunger 44, as shown in Fig. 12, is hollow and of relatively light weight while the impacting or front end 44a thereof has an insert of light weight material such as nylon or leather to cushion the force as it hits or is hit by the pilot 41. Said trigger 49 has an extending arm 51, and as will be noted from Fig. 10 has a recess 52 at its end for accommodating one end of spring 53 the other end of which is set in a recess 53' formed in the base 39. Spring 53 normally forces arm 51 outwardly about pivot pin 50 to keep notched end 48 in toward flange 47. Furthermore, said trigger 49 at its pivot is accommodated in a recess 54 in the projector base 39. Between said head flange 47 of plunger 44 and head 42 of said base member there is provided a spring 55 which is adapted to cushion the shock at the end of the stroke of plunger 44 and take up the impact of head flange 47 on the forward operating movement of said plunger to project pilot 41 out of channel 40. Said plunger 44 at its projecting end 44a is provided with a flange or collar member 57 which acts as a stop for the projecting spring member 58 while head 42 is provided with bushings 59 set in opening 43 of head 42 whereby the plunger is slidably mounted.

Said base 39, furthermore, as more clearly shown in Figs. 7, 9, 10, 11, 12 and 13 as previously indicated, is provided with forked arm projection 45 in which is pivotally mounted a horizontally operable cocking lever 60. Said lever is held in pivotal position therein by a pin 61 extending through said projection and cocking lever. Cocking lever 60, as shown, is substantially of triangular shape and is pivoted to projection 45 at apical portion 62 leaving a free end 63 for contact with an adjustable stop or interference member 18 (Figs. 1 and 6) mounted on the breast-beam 17 of the loom, and a bifurcated actuating end portion 65 for contacting head flange 47 to move the same and the plunger outwardly of channel 40 and permit locking of notched end 48 of latch or trigger 49 with flange head 47.

It will be noted also that a spring member 66 is provided around said pin 61 in the cocking member and in the projection 45 for normally biasing lever 60 to its normal position to keep the forked or bifurcated end portion 65 of the lever lined against the head of said base member. Bifurcated or forked terminal portion 65 is disposed as shown so as to accommodate the spring 55 and plunger 44 at the flanged head portion thereof so that when laybeam 12 carrying projecting units 36 and 37 is moved forwardly, the free end 63 of said cocking lever 60 is actuated by stops 18 extending rearwardly from the breastbeam 17 in the front of the loom as fragmentally shown in Fig. 6. In this manner, the bifurcated end 65 of cocking lever 60 because of the forward movement of the laybeam 12 actuating said lever around pin 61, contacts flange 47 and carries the plunger 44 out to its maximum limit of movement to the position shown in Fig. 1 whereupon notch 48 of trigger 49 latches behind head flange 47 on said plunger thereby holding said plunger against the pressure of the projecting spring 58 in position ready for projecting the pilot 41. A clamp 69 is fixed to head 42 above the plane of the trigger 49 for carrying filler thread 70 as shown in Figs. 27 to 30 inclusive.

The forward end of the pilot receiving channel 40 of said base 39 in the projecting device is provided at its vertical sides with brake liners 74 and 75 formed of friction material such as leather or the like for slowing down the rapid movement of said pilot 41 when it enters said channel 40 and also to absorb the impact of said pilot 41 as it enters said channel. Said brake liners 74 and 75 are fixed to the sides of the channel in any suitable manner, but the liner 74 is fixed only at its forward end leaving its rear end free to permit lateral movement in the channel (Fig. 10). A spring member 74a mounted between liner 74 and a plunger trip lever 77 will, when compressed, force said liner 74 into channel 40. Said trip lever 77 as shown is pivoted in a slot in base 39 by pin 78 and is provided with an extending arm 79 adapted to strike arm 51 of said trigger 49. Said arm 79 has an outwardly bulging lug 80 adapted to come into actuating contact with a spring mounted plunger 81 (Fig. 1) fixed to the frame of the loom by means of bracket 82.

The spring of plunger 81 is stronger than spring 53 and therefore can effect actuation of said arm 51 about its pivot 50. As laybeam 12 moves back and forth in the loom it reaches a predetermined position whereby the lug 80 contacts plunger 81 and in this manner the arm 79 is moved about its pivot pin 78 so that an offset hammer head 83 on said arm 79 contacts and forces arm 51 toward said base 39 against the force of spring 53. In order to keep arm 79 in outward position there is provided a spring member 84 set intermediate said base 39 and the inside of the trip lever arm 79 for normally urging the end 83 of said arm outwardly, as shown in Fig. 10.

Said arm 79 is further provided with a lateral extension or finger 85 which normally enters opening 86 in base 39, except when a spring plate 87 covers said opening as will be hereinafter described.

In lieu of the type of interlock or trip lever arm 89 as shown and hereinabove described, it will be noted that I may provide a sliding bar which would operate across the loom and operate from the picker cam shaft already in the conventional type of loom. Also, such sliding bar could interfere with cocking lever 60 on the pilot projecting side of the laybeam and clear the other.

It will be noted that the short arm 91 of trip lever 77 is guided and supported against tilting from the horizontal plane by the slotted end of a bushing 90 which is secured in the base 39. Bushing 90 also contains and guides the previously described brake actuating spring 74a. Said short arm 91 is provided with an inwardly projecting boss 92 (Fig. 7) which acts as a stop, when striking the side of base 39, to limit further movement of trip lever 77, thus serving to determine the normal position of said lever. Said short arm 91 is also provided with a hook end 94 (Figs. 10, 13, and 17) which fits into opening 95 of a laterally movable cam 96 slidably set in the initial part of the pilot-receiving channel 40 so that when said trip lever 77 is actuated said cam will be moved laterally of channel 40.

Said cam 96, as noted from Fig. 8, is a flat shaped member divided into two spaced parts 97 and 98. Said cam is adapted to slide sidewise in a recess 99 extending crosswise at the open end of channel 40. Part 97 of the cam is provided with a slot 95 while part 98 has an inclined surface 100 and a flat surface 101. Intermediate the parts 97 and 98 is a channel 102 with a slant side 103 adjoining flat surface 101 and inclined surface 100. Said channel 102 forms part of channel 40 for the passage therethrough of pilot 41. In shifting said cam 96 laterally of channel 40, inclined surface 100 is partly exposed in the channel 40 while slant surface 103 is also exposed in the channel for acting on pilot 41 as will be hereinafter described.

Spring plate 87 (Fig. 13) may be considered as part of a trip lever interlock (Figs. 7, 10, 12 and 13) and is freely pivoted near its end 104 on a pivot stud 105 secured in base 39. It will be noted that said plate further is provided with an upward projection 106 having a projection 107 for holding one end of compression spring 108 in position. A lever plate 109 lying between the side of base 39 and plate 87 is also pivoted on pivot stud 105 to permit vertical movement of a striker pin member 110 secured in the free end of plate 109 and extending into channel 40. Said trip lever plate 109 is provided at its pivotal end with a projection 111 for accommodating the other end of compression spring 108.

Also, the plate is provided with a lateral bulge or detent 112 adapted to rest against the edge of end 104 of plate 87 as urged thereagainst by spring 108. Said plate 109 has its free end carrying striker pin 110, bent outwardly to form an anchor for one end of a tension spring 114 the other end of which is anchored to a pin 115 extending from the side of base member 39.

Striker pin 110 extends from plate 109 into channel 40 by passing freely through a groove 113 (Figs. 10 and 12) provided in the side of base member 39 and brake member 74 and is normally held against the bottom of said groove 113 by said spring 114. The depth of groove 113 is such that striker pin 110 when resting on the bottom of said groove is positioned above the bottom of channel 40 a distance somewhat less than the height of the pilot 41. This position of striker pin 110 brings the free end of plate 87 into position to cover hole 86 in the side of base 39.

The trip lever interlock, comprising plate 87, plate 109 and associated parts, is provided to prevent the tripping of plunger 44 when pilot 41 first enters channel 40 but to permit tripping during the following backward stroke of the laybeam during the operation of the loom. The action of the interlock above described is as follows:

By inspection of Fig. 1, it will be noted that the laybeam is moving from front to back and is almost in the position where the pilot 41 will be projected from the right-hand projector unit 37 to the left-hand projector unit 36. In the right-hand projector unit 37, the presence of the pilot 41 in channel 40 has raised striker pin 110 thereby rotating plates 109 and 87 counter-clockwise (Figs. 7 and 13) about pivot 105 so that the hole 86 in base 39 is uncovered. The absence of the pilot in the left-hand projector unit 36 (Fig. 1) has caused the hole 86 therein to be covered. The continuing backward movement of the laybeam then causes lugs 80 on trip lever arms 79 of both projector units to strike their respective spring mounted plungers 81 thereby tending to rotate both trip levers 77. However, the left-hand trip lever 77 is prevented from rotating a sufficient distance to actuate the plunger releasing trigger 49 because the finger 85 strikes the plate 87 which is covering the hole 86 thereby pinching the plate against the side of base 39. The right-hand trip lever 77, however, is free to rotate and trip the trigger 49 because hole 86 is uncovered with the pilot within the projector unit 37.

At this point, the pilot is shot across the laybeam, carrying a filler thread with it, and into channel 40 of the left-hand projector unit 36 (Fig. 1). As the pilot passes beneath the striker pin 110 in this projector, it cams the pin and raises the plate 109, but plate 87 which would normally rotate with it is prevented from doing so so long as said plate 87 is held against any motion by the pinching action of finger 85 on trip lever 77. The spring 108, set between plates 109 and 87, is thereby compressed.

The laybeam now continues to the back limit of its stroke and starts forward. As it reaches mid-position, see Fig. 1, the left-hand trip lever 77 and its lug 80 move away from spring mounted plunger 81 and the trip lever finger 85 ceases to pinch plate 87. The interlock spring 108, which was compressed, is now free to cause plate 87 to rotate about its pivot 105 until its short arm 104 (Figs. 7 and 13) strikes the bulge 112 on plate 109. Such action uncovers hole 86 so that at the next backward stroke of the laybeam, the trip lever finger 85 can enter hole 86 and thereby permit sufficient rotation of the trip lever arm 79 to actuate the trigger 49 and thereby return the pilot 41 from the left to the right-hand projector unit.

Base 39 of the plunger unit is furthermore provided at one side of channel 40 with an opening 116 and a pin 117 extending therethrough. The pin is adapted to extend into said channel 40 and to be displaced outwardly therefrom by a pilot. Said pin 117 is utilized as a pilot detector and is normally pressed into the channel by a leaf spring 118 forming part of a micro-switch 119 mounted on the side of the base 39. Said micro-switch 119 acts as a feeler switch and is held in position on the projector units 36 and 37 by means of adjustable clamping means 120. When said pin 117 is forced out of channel 40 by the pilot 41 it actuates spring 118 and thereby causes the micro-switch 119 to open and thereby permit normal operation of the loom.

As shown in Fig. 1, the projector units 36 and 37 are shown in plan view as mounted on each end of the laybeam 12 which is depicted as in mid-position of a backward swing. The pilot 41 is shot from the right to the left projector unit during one cycle, or back and forward swing, of the laybeam; and from the left to the right projector unit during the next cycle of the loom and oscillation of the laybeam. Thus two strokes or cycles of the laybeam take place during the time the pilot leaves either projector unit and returns to the same unit.

As the laybeam 12 swings toward temples 19, one or the other spring cam 20 pushes a pilot 41 inward of channel 40 of member 39 if the pilot is not in contact with the plunger 44. This positioning of the pilot insures proper positioning of the pilot to allow of projecting and the opening of microswitch 119.

Each unit 36 and 37 is furthermore provided on plate member 122 near the open end of channel 40 with a curled thread guide or pigtail 121. Forwardly of channel 40 and disposed on extension 123 mounted on base 39 there is provided a clamp 124 for the filler thread. Said pigtail 121 and clamp 124 are provided to position the filler thread coming from a cone, not shown, in relation to channel 40 so that pilot 41 in flight from channel 40 grips the thread under the gripper at the trailing end of pilot 41. The filler thread from a cone at each side of the loom goes from the clamp 69 to guide 121 then to clamp 124.

Said pilot 41, as noted from Figs. 2 to 5, inclusive, is substantially square in cross section, is relatively small and of light-weight. Also, it tapers at each end 126 and 127 respectively. Said ends 126 and 127 of the pilot are each provided with a movable, flat-headed pin member 128 each set in an opening or recess 129. It will be noted that the head of each pin sets in a recess 130 in the pilot and is flush with the top of the pilot. Also, each pin has its free end extending in a groove 131 and is connected in any suitable manner to a leaf-spring 132 which retains the pin in position as shown in Figs. 2 and 4, whereby the head of said pin normally rests in recess 130. Said pins extend slightly outwardly of the body of the pilot. Also, said leaf-spring 132 is fixed to the pilot by means of a screw 133, as shown. The head of the trailing pin member acts as a thread gripper when the trailing end of the pilot moves out of channel 40 of the projecting unit.

Said pilot, furthermore, has two pairs of longitudinal side grooves 134 and 135 one pair being on each side of the center of the pilot. Each groove of said pairs of grooves begins at an end respectively of the pilot and terminates short of the cross-axis of the center thereof as shown in Figs. 2–5. Said grooves curve toward the side surfaces of the pilot short of its center and are provided to accommodate the projecting pin 117 controlling feeler micro-switch 119 shortly after the pilot starts to move from its projecting unit. However, the pin is actuated by the pilot when the flat ungrooved or solid central portion 136 of the pilot is opposite the pin. The pin in turn forces leaf-spring 118 to actuate switch 119. If the pilot is not in proper position in channel 40, then said pin 117 makes no contact with the central body 136 of the pilot whereupon switch 119 closes to stop the loom if an abnormal condition prevails elsewhere in the loom, as will be hereinafter described.

Also, when pilot 41 is in channel 40 and cam 96 is moved laterally of the channel by member 91, slant surface 103 in said cam acts on gripper pin 128 adjacent said cam raising the same to release the cut thread. When the pilot is ejected from the channel, the lower end of the gripper pin 128 at the trailing end of the pilot slides on surface 100, raising the head of the gripper pin so that as the pilot leaves the channel the gripper pin snaps down and grips the thread held between pig-tail 121 and clamp 124 and carries the same through the shed 22.

Each of said temples 19 has at its outboard end, as shown in Fig. 1, an upwardly extending brace or assembly 145 for supporting knife blades 146 and 146a at one side of the loom (Figs. 6, 17 and 18), and knife blades 147 and 147a at the other side of the loom. The two knife blades at each side are secured to their supporting brace 145 by means of a screw member frame 149.

During alternate cycles of the loom, the knife blades 146 and 147a cut the filler thread carried to the projector unit 36, and the knife blades 147 and 146a cut the filler thread carried to the projector unit 37. As the reed 15 moves forwardly to beat up a filler thread the end portions of the filler thread are guided downwardly by the sloping under surfaces of the braces 145 (Figs. 6, 17 and 18). The depressed end portions pass beneath the lower ends of the pair of knives 146 and 147a, or beneath the lower ends of the pair of knives 147 and 146a, according to the direction of weaving of the filler thread from one or the other side of the loom. Succeeding filler threads are cut at both edges of the cloth by one or the other pair of said knives during the initial part of the back stroke of the laybeam 12.

The bar 24, as will be noted from Figs. 14 to 16 inclusive, supports a number of successively disposed pilot guide plates 158. Said pilot guides comprise a plate of relatively thin metal and are fixed to bar 24 by clamps 162. Furthermore, each pilot guide extends through an opening in laybeam 12 and is provided with an opening 163 at its upper end thereof the floor of which is recessed to permit sliding therethrough of the free or protruding end of the gripper pin 128 in pilot 41. The opening or space 163 of said plates is substantially rectangular except, however, that there is provided a pair of opposed upwardly extending terminal slanting portions between which there is a slot 164 which allows the filler thread 70 to move out of the opening 163 during the downward movement of the bar 24 with respect to the laybeam 12. I may further provide a guide in which one of the portions is a vertical extension of the bar and the other portion slants toward but is short of meeting said vertical extension to form a slot slightly wider than the diameter of the filler thread. This is to prevent any misplaced warp threads from entering opening 163 as the guides move upwardly in the laybeam. Furthermore, the edges of said guide are pointed thereby further eliminating the possibility of the warp threads entering the opening 163.

It will be noted that said bar 24 reciprocates between upward and downward positions in relation to the laybeam 12, as shown in Figs. 15 and 16, said bar 24 moving in channel 165 formed by brackets 23.

The movement of pilot 41 carrying filler thread 70 during the weaving operation is more distinctively shown in Figs. 27 to 29 inclusive. In each of these figures, the direction and limit of travel of movement of the laybeam 12 is indicated by the arrow 168. Intermediate the projector units 36 and 37 on the laybeam 12, the cloth 169 beyond the laybeam is shown in exaggerated form indicating the warp threads as separated by the reed assembly 15. There is also shown the cross travel of the pilot 41 from the right to the left within the shed 22, shown in Fig. 6. In Fig. 27, pilot 41 is in the projecting unit 37 from which said pilot carries the filler or carrier thread through the shed formed by the warp threads 16. This action is going on while the laybeam is moving to the rear or back position as shown by arrow 168, in Fig. 28, whereupon filler thread 70 having been carried through the shed 22 extends across the warps 16 as shown, whereupon the filler thread 70, due to the forward movement of the laybeam 12, becomes part of the cloth, as shown in Fig. 29. During the backward movement of laybeam 12, as shown, pilot 41 carries filler thread 70 toward projector 36. Knife blades 146, 147, 146a and 147a work diagonally opposite each other in pairs (146 and 147a) (147 and 146a), as hereinbefore described, since they are arranged in relation to the movement of pilot 41. As the laybeam is in its back position, as shown in Fig. 28, pilot 41 has entered projector 36. In this case, thread 70, as shown in Fig. 29, is cut by blades 146 and 147a, leaving the cut thread as part of the resultant cloth. On the other hand, blades 147 and 146a cut the filler thread after the pilot has carried a new end of thread through the shed to the right. For every cycle forward and back of the laybeam there is one projection of the pilot through the shed. It will be noted that these knives operate when the laybeam is past the beginning of its backward stroke. As the laybeam finishes its forward stroke the pilot end of the thread passes under the most forward knife 147a (or 146a) and the supply end of the thread passes under the most rearward knife 146 (or 147). Hence, the beat-up thread is subsequently cut at both edges of the cloth, either by the pair of knives 146 and 147a, or by the pair of knives 146a and 147, depending upon the direction of entry of the particular thread. With the pilot in the left hand projecting unit 36, as shown in Fig. 29, the filler thread hooks onto the cutting edge of the knife 147a immediately the laybeam starts its backward movement, but the more rearward knife 146 (Figs. 17 and 18) does not cut the thread until after the thread is gripped by the clamp 124 of the right hand projecting unit 37 (Fig. 29), thereby assuring that the thread is held between the eye 121 and the clamp 124 in position to be picked up by the pilot when it is projected from that unit during the next cycle of the loom. It will be noted that the knives, as shown in Fig. 17, slant back forming a hook to cause the thread to slide along the cutting edge as the laybeam moves backward. The small pieces or strands of thread 171 left in the gripper in the pilot after the filler thread is cut are automatically released by virtue of the lifting of the gripper pin during the movement of cam plate 96 in channel 40. Such small pieces of thread are disposed of by any suitable means such as by a vacuum or blower attachment provided for such purpose, not shown.

Disposed at one or more places in a recess 172 on the laybeam 12 and intermediate the projector units 36 and 37 there is provided one or more sets of feeler fingers 173 which maintain contact with the filler thread 70 being carried by pilot 41 across the loom. Such fingers provide for the safe operation of said loom during the weaving process and are adapted to cause automatic stoppage of the operation of the loom in the event the cross or filler thread 70 is broken or snaps during the weaving operation. Said feeler fingers, as noted, in Figs. 19 to 21 inclusive, are secured to a shaft 174 pivoted in suitable brackets 175 one of which is shown mounted in any suitable manner in Fig. 19 on the laybeam 12. Said feeler fingers, as shown, are spaced relatively of each other and operate in unison. Shaft 174 also has secured thereto an actuating member 176 which rotates with the fingers. Said member 176 abuts a spring plate 178 which in turn forms part of microswitch 179 mounted on said bracket 175. A detent member 180, also mounted on said shaft 174 is adapted to move simultaneously with feeler fingers 173. Said detent 180 is provided with a notch or recess 181. As shown in Fig. 19, the feeler fingers are in down position in the recess 172 while the laybeam is at the forward end of its stroke. Journalled in brackets 23 (Fig. 17) carried by laybeam 12 there is provided a shaft 182 on which is loosely and pivotally mounted a fork detent 183. Said detent 183 has an extending portion 184 for normally engaging detent 180 at recess 181 on said shaft 174. It will be noted that forked detent 183 has ends 185 and 185a forming a bifurcation between which is a stop pin 186 carried by a lever 186a fixed to shaft 182. Said ends 185 and 185a permit loose movement of detent 183 on said shaft 182. Said shaft 182 is provided at its free end with a lever 187 which is actuated by fingers 191 and 192. Said lever 187 has at its free end 188, a pin member 189 onto which is a roller 190 which forms contact with said fingers 191 and 192 adjustably spaced and screwed or fixed to the cam plate 27, as more clearly shown in Fig. 6 of the drawing. Said fingers 191 and 192 act as stops and are set with respect to the feeler fingers 173 which are pushed upwardly by spring plate 178 as shown in Fig. 20. Roller 190 on lever 187 strikes against finger 192 whereupon shaft 182 is rotated so that pin 186 forces detent 184 upwardly thereby permitting the fingers to rise until they meet the filler thread 70 (Fig. 20). It will be noted that when the detent 184 is moved from said recess 181, arm 180 is released and feeler fingers 173 are moved upwardly by spring plate 178 extending from microswitch 179, or some other spring, not shown, until they contact the filling yarn 70 thereby keeping said microswitch open. In the event the filler thread 70 is broken, feeler fingers 173 on said shaft 174 will continue to move upwardly as shown in Fig. 21, whereupon they rise beyond the normal height above the laybeam. In such case detent 176 allows spring plate 178 on switch 179 to move back until the switch is closed, thereby shutting off the operation of the loom. The closing of the circuit 235, 235a, 216, as shown in Fig. 30, releases a master or shipper lever 193 and its associated mechanism, as shown in Fig. 22. With the loom being stopped the broken filler thread 70 may be replaced, pilot 41 repositioned and the loom made ready for resumed operation. Said feeler fingers 173, it will be noted, provide operating means for an electric circuit system which will automatically release said master or shipper handle 193 and its conventional mechanism, not shown, thereby disengaging the conventional clutch and applying the brake on the loom, not shown, causing it to stop operating.

As shown more clearly in Figs. 22 to 25 and 30, the master or shipper handle 193 is loosely pivoted to a bracket 195 on loom frame 11. Said handle has a lower pivotal portion 196 with an extension 197 to which is connected one end of a tension spring 198, which spring in turn is connected at its other end with a pin 199 extending from the side of bracket 200 mounted on one side of the loom frame 11. Said handle or lever 193 is adapted to slide within a groove or slot 201 in said bracket 200 and is normally held in loom operating position within said bracket as shown in dotted lines in Fig. 24. Bracket 200 is provided with a trigger 203 pivotally mounted on a shaft 204. Said trigger 203 is provided at its pivotal portion with a tension spring 205 extending around said shaft 204. Said spring 205 is fixed at one end against said trigger 203 and its other end against a stop pin 206 fixed to the side of said bracket 200. Said bracket 200 is further provided with a pin 207 which acts as a stop for trigger 203. Furthermore, trigger 203 has a shoulder 208 at its pivotal portion for accommodating said master or shipper handle 193. Said trigger 203 is normally held in position at its free end as shown in Fig. 24, by means of a spring detent trip 209 slidably mounted in housing 210 on said bracket. Said detent trip 209 is provided with a cross stop pin 209a to limit its movement inward of the housing 210. Furthermore it is connected by means of linkage member 211 and pins 212 and 213 to core member 214 of solenoid 215 which is in electrical circuit 216. There is also provided a tension spring member 217 fixed between the linkage member 213 and said housing 210 for normally pulling the core 214 out of solenoid 215 after being deenergized and also for extending the free end of detent 209 to the right of housing 210 to hold trigger 203 in locked position. Link 211, as shown in Figs. 22 and 24 is provided with a slot 211a to take advantage of the inertia of core member 214 to move detent 209 in case it tends to stick when solenoid 215 is energized. Said bracket 200 is further provided with a stop pin or bumper 207a for controlling the downward spring action movement of trigger 203 when the same is sprung and releases lever 193. Said frame, as shown in Fig. 22 is provided with a rotatable shaft 218 extending between said frames 11 having at one end thereof a rotatable arm member 219 which forms contact with the handle 193 as shown in Figs. 22 and 23, when the loom is not in operation. Said arm member 219 extends radially from shaft 218 and then at right angles with a slight forward bend therein as seen in Figs. 22 and 23, to maintain operative contact with handle 193. Shaft 218 is also provided with a pair of radially extending spaced members or daggers 220 and 221 which upon actuation of member 219 by lever 193 form contact with and stop further movement of laybeam 12 when said master or shipper handle is actuated to close down the loom. Said arm member 219 is loosely mounted on said shaft and is provided with a collar 222 having an upwardly extending arm 222a. There is also provided on said shaft 218 a collar 223 with an upwardly extending arm 224. Said collar is pinned or keyed to said shaft 218. It will be noted that arm 219 with its collar 222 is loosely mounted on said shaft and is held in position on said shaft by means of a fixed member 222' at the end of said shaft. Each of said arms 222a and 224 is recessed for accommodating therebetween a compression spring 225 which tends to force said arms 222a and 224 apart. Collar 223 is provided with a peripheral recess or keyway 226 for accommodating tooth 227 on the other collar, said keyway acting as a stop for said tooth, thereby preventing full rotary relative movement of said collars 222 and 223. Said arm 219 is actuated by shipper lever 193 so that member 222a on member 222 moves against spring 225 which in turn actuates member 224 on member 223 so as to rotate shaft 218 having daggers 220 and 221 to stop further movement of laybeam 12 on its forward stroke. Key member 227 on collar 222 and keyway 226 on collar 223 provide independent motion to permit partially arrested movement of shaft 218 if daggers 220 and 221 rise while beneath the laybeam, thereby permitting lever 193 to trip and stop the operation of the loom.

In Fig. 30 there is shown a diagrammatic generalized view incorporating the electrical circuit and safety features forming part of my invention. The loom shown in the drawings is provided with a plurality of sets of slider feeler bars 227', 227a; 228, 228a; 229 and 229a; respectively, each of which sets comprises a drop wire type of frame having pairs of metal strips disposed under the warp threads 16 shown in Figs. 27, 28 and 29 respectively. Said slider feeler bars act as detectors for any broken warp thread. One of the bars in each set, namely, 227', 228 and 229, is adapted to oscillate as shown by the arrows in Fig. 30, while the other bar, namely 227a, 228a and 229a in each set is adapted to make contact with an actuating member 230 which in turn will form contact with switch 231 which is held in open position by means of stop member 232 against the pressure of spring member 233 conveniently disposed on the frame of said loom. Said switch 231 is known as the warp thread detector and in the event the warped thread breaks, the normal oscillating bar in each set will be connected to the normally stationary bar by means of drop wire mechanism, not shown, thereby operating member 230 which in turn will close normally open switch 231 forming part of the circuit 216. It will be noted that while said switch 231 is normally open, when closed, circuit 216 will energize solenoid 215 which pulls core 214 whereby retracting detent 209 from contact with trigger 203 and releases the same, which trigger automatically moves in the dotted line position shown in Fig. 24 whereupon the master lever 193 is released. Lever 193 is then brought into the off position by means of spring 198 as shown in Fig. 22, thereby turning off the operation of the loom.

As to the operation of the feeler fingers 173 described hereinabove and shown in circuit 216 in Fig. 30, it will be noted that switch 179 which is in circuit 216 with the line 235 and 235a is normally open so that if the feeler fingers extend beyond their normal height as shown in Fig. 21, the filler thread detector switch 179 as shown in Fig. 19 and in Fig. 30 is closed whereupon the circuit being closed energizes the solenoid 215 and repeats the operation as above described so as to throw the master or lever handle 193 to stop the operation of the loom.

As to the pilot detector switch 119 on each unit 36 and 37, it is normally closed, and opens when the pilot 41 is in place in the channel of the respective projecting unit. Said switches are in connection with each other by line 234 and in connection with circuit 216 by lines 233a and 235. As long as pilot 41 is in either channel the circuit through both switches 119 is open, therefore the trip mechanism of lever 193 cannot operate. However, if the pilot is out of place, both switches 119 are closed.

Laybeam 12 is also provided at one end with a pivotal spring detent 237 which is adapted to contact and actuate an interlock switch 238 which is normally open. Switch 238 is provided to prevent stopping of the loom while the pilot is in flight. Switch 238 is timed to be closed during flight of the pilot and to open again while the pilot 41 is correctly located in a projector, and one of the switches 119 is open. If it were not for switch 238 the loom would stop as soon as the pilot left the projector. Said spring detent 237 is adapted to make contact with said normally open switch 238 at the approximate middle of the forward stroke of the laybeam. Interlock switch 238 will stop the loom during the forward movement of the laybeam in case the pilot is not in its proper position in either unit 36 or 37 and closes only during the period of time the pilot should normally be in its proper projecting position. Said switch 238 provides a time lag after the switches 119 are set to indicate an abnormal condition in the loom. In other words, switch 238 closes and opens while the pilot is in proper position in one of the projectors and while either switch 119 is open.

It will be noted from the foregoing that there are four safety features used according to my invention for electrically controlling the operation of the loom. One relates to the warp thread, another relates to the filler thread, another relates to the control and positioning of the pilot in the projector units, and another relates to an interlock switch in conjunction with pilot switches. It is to be understood that the master or shipper handle can be manually operated instead of being electrically operated as shown and described herein.

In Fig. 31 I have shown a modified form of cocking mechanism for each pilot-projecting unit. It will be noted in this modification that I provide a slidable cocking member or rack 240 mounted on the side of base 39. Said rack is provided with a fork extension 241 disposed intermediate head flange 47 and base member 39. Mounted on the frame is a reduction gear member 242 which is in mesh with rack 240 so as to actuate the same. The fork 241 in turn moves plunger 44 against the action of spring 58 so that latch stop 49 engages plunger head 47. Pivotally mounted with said reduction gear 242 on base 39 is a smaller gear member 243 which is in engagement with an actuating rack 244 which forms contact with stop member 18 on loom frame 11 in a similar manner as cocking lever 60 as shown in Fig. 1. Said actuating rack 244 is mounted on a bracket 245 on base 39 and is provided with a spring member 245a for normally bringing the rack in outer position against the operation of the small gear 243. By this arrangement there is permitted greater movement of cocking member 240 with a lesser movement of the laybeam after rack 244 strikes stop member 18.

In Figs. 32, 33 and 34, I show a modification of the arrangement and operation of feeler finger 246. These fingers are operated from the laybeam and by the position of the guide bar with respect to the laybeam. Said finger as will be noted from Fig. 32 is provided with a hook end 247 and is pivoted to bracket 248 on said laybeam 12. Said finger 246 forms a sliding contact with spring leaf 178 on switch 179 keeping the same open. Said finger is operated by means of a link member 249 which is connected to lever 250 which is pivoted at one end to laybeam 12. Said lever 250 has a tab 251 which is contacted by guide bar 24. The under side of finger 246 makes contact with filler thread 70 and rests against the same when the thread is unbroken. Lever 250 is brought into relatively horizontal position by the bar 24 thereby raising the finger 246 by means of link 249 to the position shown in Fig. 32. When the bar 24 and the pilot guide plates 158 descend and the unbroken filler thread is exposed, said finger rests against said thread, as shown in Fig. 33. The open switch remains open since hook 246 still contacts spring 178 in switch 179. In the event the filler thread is broken, as shown in Fig. 34, finger 246 having nothing to rest upon, falls flat on the laybeam 12 whereupon hook 247 breaks contact with spring leaf 178 thus permitting of closing the switch 179 which will then automatically close the circuit 235, 235a, 216, shown in Fig. 30 so as to trip or actuate the master or shipper handle 193 as soon as the switch 179 closes.

In the operation of the invention disclosed hereinabove, the pilot 41 fits in the channel of either projecting unit and when projected passes through the guides 158 mounted on guide bar 24. Said guides disappear in the laybeam for clearing the edge of the cloth and the filler thread so that the latter can be acted upon by the reed on the forward stroke of the laybeam 12. The plunger 44 in each projecting unit is operated during the movement of the laybeam by the cocking lever to bring the plunger into position with trigger 49. The channel in each projecting unit receives the pilot which at all times is confined by the guides so that it cannot leave its path of travel, and as it passes through the shed it carries the filler thread therethrough from a cone, one located on each side of the loom. The plunger then is moved back with the laybeam.

The adjustable stop or interference member 18 located on each side of the loom and ahead of the laybeam is provided so that when the laybeam moves forward the forked end 65 of cocking lever 60 for the spring plunger last tripped is operated and the plunger is cocked and latched. The other cocking lever 60 in the other plunger device merely moves forward and back independently of the spring plunger which is already in cocked position. In other words, there is always one alternate or idling stroke when the cocking lever does not act on plunger 44. After the plunger 44 is latched or cocked, both cocking levers are moved back to their normal position by means of springs 66 so that they are out of the way when the plunger 44 is tripped. The cross filling yarn 70 as shown in Figs. 27 to 29 inclusive, is passed through a suitable tension device to avoid slackness through a pigtail and across the path of the pilot 41 whereby the trailing gripper as it is acted upon by cam 96 serves to contact filler thread 70 and grip the same as gripper pin rides off of cam 96.

Safety devices according to the invention are provided and electrically operated. The control lever or master shipper handle 193 at the side of the loom, as shown, is pulled to the right, as viewed in Fig. 22, to start the loom and is held in position by hooking onto a detent or latch hook. Such lever remains latched but is movable by easily operating trip trigger 203 which in turn is operated by energization of solenoid 215 and the loom is promptly stopped.

As the pilot carrying the filler thread or yarn is projected back and forth through guides 158 on the square bar 24 through shed 22 the thread is in a position to be contacted by feeler fingers 173 thereby affording a safe operation of the loom for this particular part of the operation. In addition, the slider feeler bars 227 to 229a are also in operation as a safety check for the warp thread. It will be noted therefore that if there is a break in either the warp thread or the filler threads the respective switch 231 or 179 operates to actuate the master shipper handle or lever 193.

In every case, interlock switch 238 is normally open, and closes on the forward travel after the pilot is in its projecting position in one of the projectors. It opens again before the pilot leaves such position.

From the above, it is apparent that the failure of warp or filling threads, or of the pilot to be properly in the channel 40 of member 39 will stop the loom after switch 238 is operated or closed. Also, if pilot 41 is not in position against spring plunger 44 interlock switch 238 stops the loom and prevents its projection.

From the foregoing, it will be noted that by my invention I provide efficient means for weaving while such means are under positive control. There is at every stroke or movement of the laybeam a definite interaction of switches for control of electrical operation of the loom.

I claim:

1. In a loom, a laybeam, a pilot for carrying a filler thread across said loom, a pilot projecting device at each end of said laybeam, means for operatively controlling the cross movement of the pilot across a shed of said loom, means carried by said pilot and adapted to form-contact with and pick up the filler thread to be carried by said pilot across said shed, movable guide means on said laybeam for guiding said pilot, and means for moving said guide means with respect to said laybeam for permitting the thread to extend across the open shed of said loom.

2. In a loom, a laybeam, a pilot member for carrying a filler thread across the loom lengthwise of said laybeam, a projecting device at each end of said laybeam for projecting said pilot, means for operatively controlling the movement of the pilot across the loom, and reciprocable guide means comprising a plurality of members having aligned openings, said guide means being extendible through said laybeam for guiding said pilot, and means for displacing said guide means for permitting the thread to extend across the open shed of said loom.

3. In a loom, a laybeam having a plurality of successively arranged openings therein, a projecting device at each end of said laybeam, a pilot member adapted to be moved by said devices from one to the other for carrying a filler thread across the shed of said loom, means for operatively controlling the cross movement of the pilot across the shed of said loom, means carried by the laybeam and adapted to sense the presence or absence of a filler thread carried by said pilot across said shed, and reciprocable guide means extending through the openings of said laybeam for guiding said pilot on its passage from one device to the other and permitting the filler thread to leave said guide means to extend across the open shed of said loom.

4. A loom comprising a frame, a laybeam on said frame, means for actuating said laybeam, a projecting device mounted on each end of said laybeam, a pilot member adapted to be projected lengthwise of said beam by either of the said projecting devices for carrying a filler thread across said loom, a plurality of spaced guides reciprocable in said laybeam, a guide bar supporting said guides adapted to reciprocate with respect to said laybeam, pilot-controlled means in each of said devices for automatically discontinuing operation of the loom when said pilot is not in proper position in either of said devices, means operable by said laybeam for stopping the operation of the loom when said pilot controlled means are ineffective for stopping the loom.

5. In a loom, a laybeam, means for swingably operating said laybeam, a projecting device on each end of the laybeam operable and in phase with the swinging movement of the laybeam, a bar member in connection with the laybeam adapted to be moved in phase with the same and extend upwardly with respect thereto, a plurality of successively arranged guide members on said bar member adapted to extend through the laybeam during its upward movement toward the laybeam, said guide members having openings therein, a pilot alternately projectible by said devices through the openings of the guide members for carrying a filler thread across the loom through a shed, means on said laybeam for contacting the filler thread as it is carried across the loom, an electrical circuit in connection with said means adapted upon loss of contact of the filler thread by said means to cause stoppage of the operation of the loom, and fixed means at each device for cutting the filler thread after the pilot has passed through the shed and is received by the other device.

6. In a loom, a laybeam, means for swinging said laybeam, a pilot projecting device on each end of the laybeam, means in the loom for cocking said device, a bar member carried by the laybeam adapted to be moved in unison with the same, a plurality of successively arranged guide members mounted on said bar member and adapted to extend through the laybeam during a certain part of its movement, a pilot receivable and projectible by said devices through the guide members during the cyclic swinging of the laybeam, said pilot being adapted to carry a filler thread across the loom through a shed, means in the projecting devices for selectively releasing said pilot therefrom during the swinging of said laybeam, pressure sensitive means on said laybeam contacting the filler thread carried across said loom and controlling the operation of said laybeam, and means for cutting the filler thread after the pilot has passed through the shed and is received by the other device.

7. In a loom, a laybeam having a plurality of successive slots therein, means for operating said laybeam to swing the same backward and forward on the loom, a shed of warp threads for filler threads, a projecting device mounted on each end of the laybeam, a bar member carried by the laybeam adapted to be moved in unison with the same and to rise vertically relatively thereto, a plurality of successively arranged guide members mounted on said bar member adapted to extend through the respective slots of said laybeam during a certain part of its stroke cycle, a pilot receivable and projectible by each device, said pilot passing when projected through the guide members and adapted to carry a filler thread across the loom through the shed, means on the loom disposed adjacent each projector for cutting the filler thread from the pilot after it has passed the shed and enters the receiving projecting device, feeler means on said laybeam for contacting the filler thread as it is carried across said shed, and control means in connection with said feeler means operable by the pilot when set in either projecting device.

8. A loom according to claim 7, in which the pilot is provided with thread gripper means at its leading and trailing ends and said projector device is provided with camming means for actuating said gripper means to release the cut filler thread at one of said means, and to engage the filler thread at the other end of said means as the pilot is being projected from the device.

9. In a loom, a laybeam, means for operating said laybeam, a pilot for carrying a filler thread across said laybeam, means at each end of the laybeam for alternately projecting said pilot lengthwise of said laybeam, feeler fingers mounted on the laybeam and adapted to contact said filler thread carried by said pilot, a main electrical circuit, an electrical circuit in connection with said main circuit and containing a switch operable by said feeler fingers, a pilot detector switch in each of said pilot-projecting means on the laybeam, another circuit interconnecting the main circuit and the pilot detector switch in each of said pilot-projecting means, interlock switch means in connection with said main circuit and said last named circuit, for stopping said laybeam if and when said pilot detector switches are closed, and operable energizable means in connection with said main circuit for controlling the operation of said laybeam.

10. In a loom for weaving cloth and the like, a laybeam, a bar movable in unison with said laybeam, a plurality of successively arranged guides on said bar adapted to extend through said laybeam when the bar moves therewith, a projector device on each end of said laybeam actuable by the movement of said laybeam, a pilot adapted to be projected lengthwise of the laybeam through said guides by said devices, said pilot carrying a filler thread through a shed, electrical control safety means in each device adapted to make contact with the pilot when it is in each device, contacting means for the filler thread, means operable by said control safety means and the contacting means, for stopping the operation of the laybeam, said last-named means including an electrical circuit controlled by said contacting means and control safety means.

11. In a loom, a laybeam, a guided bar movable in unison with said laybeam, a plurality of successively arranged guides on said bar adapted to extend through said laybeam when the bar moves therewith, a projector device mounted at each end of said laybeam, a pilot projectible by said devices lengthwise of the laybeam, said pilot carrying a filler thread through a shed, safety means in each device adapted to make contact with the pilot when it is in each device, contacting means carried by said laybeam for contacting the filler thread carried through the shed by said pilot, loom-stopping means operable by said safety means and the contacting means, and an electrical circuit for said stopping means, contacting means and control safety means.

12. In a loom, a laybeam, means operating said laybeam, a bar reciprocably movable in unison with said laybeam, a plurality of successively arranged guides mounted on said bar adapted to extend in and out of the top of said laybeam when the bar moves therewith, said guides having openings therein, a projector device on each end of said laybeam, operable on the cyclic movement of said laybeam, a pilot projectible by said devices lengthwise of the laybeam through the openings of said guides, said pilot carrying a filler thread through a shed, operable safety means in each device adapted to make contact with the pilot when it is in each device, pressure contacting means on the laybeam for the filler thread for normally keeping the loom in operation, and loom-stopping means in electrical connection with said safety means and the contacting means, including a circuit, contacts controlled by said contacting means and by said safety means.

13. In a loom, a laybeam having a plurality of slots therein, means for operating said laybeam to swing the same around its pivot, a bar mounted on said laybeam and movable in unison with said laybeam, a plurality of successively arranged guides mounted on said bar adapted to extend through the slots of said laybeam when the bar moves upwardly with respect thereto, a projector device on each end of said laybeam selectively actuable upon the swinging movement of the laybeam, a pilot adapted to be projected through said guides by either of said devices, said pilot carrying a filler thread through said guides, control means mounted on each device having means forming operable contact with the pilot when it is in each device, contacting means on the laybeam forming pressure contact with the filler thread during its passage lengthwise of the laybeam during the operation of the loom, means in electrical connection with said control means and the contacting means for stopping the operation of the loom when the pilot is not properly set in either device or the filler thread is broken, and a circuit for said stopping means, contacting means and control safety means.

14. A device for projecting a filler thread pilot in a loom mountable on a laybeam, comprising a base member for receiving a pilot, a pilot projecting plunger member movable in said base member, a cocking member for said plunger member, a latch member for holding said plunger, a trip release member for said latch member, a trip interlock member for preventing said trip release member from actuating said latch member unless said pilot is in said base member, and means for making contact with the pilot when in said base member, said means being connected with said interlock member and adapted to displace said interlock member when said means makes contact with said pilot thereby to enable said trip release member to actuate said latch member.

15. A device for projecting a filler thread pilot in a loom comprising a base member for receiving a pilot, a pilot plunger member movable in said base member, a cocking member for said plunger member, a trip release member pivoted to the base member for said plunger member, a pivoted trip interlock member mounted on the base member intermediate the base member and the trip release member and means extending through the base member for making contact with the pilot when in said base member, said means being connected with said interlock member.

16. A device for projecting a filler thread pilot in a loom, comprising a base member for receiving a pilot, a pilot plunger member movable in said base member, said pilot having releasable yarn gripping means at each end thereof, a cocking member for said plunger member, a trip release member pivoted to the base member for said plunger member, a pivoted trip interlock member mounted on the base member intermediate the base member and the trip release member, means extending through the base member for making contact with the pilot when in said base member, said means being in connection with said interlock member, and operable switch means in connection with the base member adapted to be actuated by said pilot when in the base member.

17. A device for projecting a filler thread pilot in a loom comprising a base member for receiving a pilot having grippers for gripping threads, a pilot plunger member movable in said base member, a cocking member for said plunger member, a trip release member for said plunger member, a pivoted trip interlock member, means extending through the base member for making contact with the pilot when in said base member, said means being in connection with said interlock member, operable means in connection with the base member adapted to be actuated by said pilot when in the base member, and means movable laterally of the base member for actuating the thread grippers on said pilot during its entry and exit from the base member.

18. A device for projecting a filler thread pilot in a loom comprising a base member for receiving a pilot having grippers for gripping threads, a pilot plunger member movable in said base member, a cocking member for said plunger member, a trip release member pivoted to the base member for said plunger member, a pivoted trip interlock member mounted on the base member intermediate the base member and the trip release member, means extending through the base member for making contact with the pilot when in said base member, said means being in connection with said interlock member, operable electric circuit switch means in connection with the base member adapted to be actuated by said pilot when in the base member, and means movable laterally of the base member for actuating the thread grippers on said pilot during its entry and exit from the base member.

19. A device for projecting a filler thread pilot in a loom comprising a base member for receiving said pilot, a pilot projecting plunger member movable in said base member, a cocking member for said plunger member, a latch for holding said plunger member in cocked position, a trip release member, trip interlock means intermediate the base member and the trip release member, means for making contact with the pilot when in said base member, said pilot-contacting means being in connection with said interlock means to displace said interlock means when the pilot is in the base member, and means on said base member adapted to operate said plunger member.

20. A device for projecting a filler thread pilot in a loom comprising a base member for receiving said pilot, a pilot plunger member movable in said base member, a cocking member for said plunger member, a trip release member pivoted to the base member for said cocking member, a pivoted trip interlock member mounted on the base member intermediate the base member and the trip release member, means extending through the base member for making contact with the pilot when in said base member, said means being in connection with said interlock member, operable electric circuit switch means in connection with the base member adapted to be actuated by said pilot when in the base member, and means on said base member adapted to operate said plunger member.

21. In a loom, the combination with a laybeam, of a shuttle or pilot projecting device, said device comprising a body member having a channel for accommodating a thread-carrying pilot therein, releasable tensioned projecting means for forcing said pilot from said body member across the shed of said loom, pivotal locking means for said projecting means, a trip member adapted upon movement of the laybeam to actuate said projecting means, said channel having a pair of opposed braking members therein for slowing down the speed of the pilot into said body member, one of said braking members being movable inwardly of the length of said body member, a brake release member for actuating said trip member, a plate member adapted to move between the brake release member and the body member for selectively controlling the operation of the trip member upon selected swinging movement of the laybeam, and control means extending into the body member for making operative contact with the pilot.

22. The combination in a loom according to claim 21, in which the projecting means passes through the body member and is provided adjacent one end with a recoil element and the other end extends into the channel of said body member with a spring adapted to force the projecting means forward to strike the pilot and force the same from the body member and said control means is in connection with an electrical circuit for controlling the operation of the loom.

23. In a loom, a projecting device for a thread carrying pilot having thread gripping means therein, said device comprising a body member for accommodating said pilot, tensioned projecting means adapted to extend through the body member for actuating said pilot, pivotal cocking means for said projecting means, a trip member adapted to engage said projecting means, said body member having opposed braking members therein for slowing down the entry of the pilot, one of said braking members being movable inwardly of the length of said body member, a brake release member pivoted to said body member for actuating said trip member, a spring plate member movable between the brake release member and the body member for selectively controlling the operation of the trip member, means extending into the body member for making operative contact with the pilot, a laterally movable cam member in the body member adapted to operate the thread gripping means of said pilot.

24. In a loom, the combination with a laybeam, of a thread-carrying pilot, a pilot projecting device mounted at one end of the laybeam, said device comprising a body member for accommodating said pilot, a drive member adapted to project said pilot, means for retracting said drive member from a body member, means on the body member for engaging said drive member, means adapted to actuate another engaging means, a cam member in connection with and actuable by said last named means, a pair of opposed brake members in said body member to retard the movement of the pilot when entering the body member, trip lever means intermediate the body member and the means for actuating the engaging means for preventing the operation of the same when the pilot is not in the body member, said pilot having gripping means actuable by said cam member on the outward movement of the pilot from the body member, means extending into the body member operable by said pilot, and an electrical circuit controlled by said last named means for controlling the operation of said laybeam.

25. The combination in a loom according to claim 24, in which said pilot has thread gripping means at each end thereof, said gripping means being actuable by said cam member for selectively releasing portions of thread remaining thereon after passing through a shed and for picking up thread extending across the base member and carrying the same through another shed to form a woven cloth.

26. The combination in a loom according to claim 24, in which the laybeam is provided with a projecting device at each end thereof, the laybeam being further provided with a plurality of openings therein, means reciprocable with respect to the laybeam, a plurality of guide members for said pilot mounted on the last-named means and adapted to extend through the openings of the laybeam, means in the laybeam contacting the filler thread carried by the pilot and an electric circuit in connection with said last means in the laybeam for controlling the operation of the loom.

27. A shuttle or pilot projecting device for a loom comprising a body member having a channel extending therethrough for accommodating a pilot, a tensioned plunger adapted to extend through the member into the channel for actuating said pilot, a trigger for locking said projecting means, a cocking member adapted to retract the plunger from the channel for engagement with the trigger, a pair of opposed braking members for slowing down the entry of the pilot into said channel, one of said braking members being movable inwardly of the axis of said channel, a brake release member for actuating said trigger to release the plunger, a pin member extending into the channel, means for holding said pin member, said last means being adapted to move between the brake release member and the body member for selectively controlling the operation of the trigger, safety control means extending into the channel for operatively making contact with the pilot, and an electrical circuit in connection with the safety control means operable thereby.

28. A shuttle or pilot projecting device for a loom, comprising a body member having a channel for accommodating said pilot, projecting means adapted to extend through the said body member into the channel for actuating said pilot, locking means for said projecting means, a trip member to engage said projecting means, a brake release member for actuating said trip member, a spring plate member adapted to move between the brake release member and the body member for selectively controlling the operation of the trip member, and safety control means extending into the channel for making operative contact with the pilot.

29. The combination set forth in claim 28 including a circuit in connection with said safety control means, and means in the loom in electrical connection with the safety control means for discontinuing the operation of the loom when said pilot is not in operative contact with the safety control means.

30. A loom comprising a laybeam, means for operating said laybeam to swing the same back and forth in said loom, a projecting device mounted at each end of the laybeam, a pilot ejectible from either device for carrying a filler thread across the loom to weave a cloth, contacting means on said laybeam for said filler thread, an associated electrical circuit operable by said contacting means for controlling the operation of said laybeam, safety means in each of said devices for said pilot operable by said pilot when it enters each of said devices, spring cam means adapted to push the pilot into position in said devices, a second circuit connected in parallel with said first-named circuit and including a switch controlled by one of said safety means, another switch controlled by the other of said safety means and a third switch controlled by the movement of the laybeam, and means operable by said circuits for stopping the operation of the loom.

31. A loom according to claim 30, in which the pilot is provided with thread gripping means at each of its ends, and fixed thread cutting means adjacent each device for cutting the thread after the pilot has been propelled from one device to the other on the swinging movement of the laybeam.

32. A loom according to claim 31, in which each device is provided with camming means for actuating one of the gripping means in the pilot for releasing the cut thread after the pilot passes through a shed and for actuating the other gripping means to take up thread on its way from a projecting device.

33. A loom according to claim 30 in which the contacting means comprises pivotal means including fingers for making contact with the filler thread, said fingers being actuable by the movement of the laybeam.

34. A pilot for carrying a filler thread through a shed of warp threads formed in a loom comprising an oblong member having a recess in at least one side thereof and a hump interrupting the recess intermediate the ends of the member and providing a switch operating cam, and thread gripping means at each end of the member.

35. A pilot according to claim 34 in which the gripping means extend laterally through the member, are under tension and are adapted to be operated to retain or free a thread carried by the pilot.

36. In a loom for weaving cloth, a frame, a laybeam, a pilot with operable grippers for carrying filling thread lengthwise of said laybeam, a pilot-projector mounted on each end of said laybeam, energizing and timed tripping means for said projectors, retractable guide means for controlling the path of pilot travel, means for aligning said guide means with said projectors while the pilot is in flight, releasable stopping means to receive and hold said pilot in place for the next projection of said pilot, and timed means operable in conjunction with said pilot to make the projector containing the pilot operable, to release said stopping means and operate said grippers to grip the filling thread and carry it through a shed.

37. In a loom having mechanism for reciprocating a laybeam, the combination comprising a laybeam, weft insertion means, means for guiding said weft insertion means lengthwise of said laybeam, said guiding means including a plurality of displaceable members spaced along said laybeam and having aligned openings adapted to provide an open passageway for directing the passage of said weft insertion means, and spaces intersecting said openings through which a threaded weft is removable from said openings during the forward movement of the laybeam, and means operable in timed relation to the movement of said laybeam for moving said guide means with respect to said laybeam to and from the position at which said weft insertion means may be directed across the loom.

38. In a loom having mechanism for reciprocating a laybeam, the combination comprising a laybeam, weft insertion means, means for guiding said weft insertion means lengthwise of said laybeam, said guiding means including a plurality of displaceable members spaced along said laybeam and having aligned openings adapted to provide an open passageway for directing the passage of said weft insertion means, and spaces intersecting said openings through which a threaded weft is removable from said openings during the forward movement of the laybeam, a bar carried by said laybeam, means securing said members to said bar, guide means on said laybeam for guiding said bar for movement relative to said laybeam, and means for actuating said bar with respect to said laybeam during movement of the laybeam.

39. In a loom having mechanism for reciprocating a laybeam, the combination comprising a laybeam, weft insertion means, means for guiding said weft insertion means lengthwise of said laybeam, said guiding means including a plurality of displaceable members spaced along said laybeam, and having aligned openings adapted to provide an open passageway for directing the passage of said weft insertion means, and slots intersecting said openings through which a threaded weft is removable from said openings during the forward movement of the laybeam, a bar carried by said laybeam, means securing said members to said bar, guide means on said laybeam for guiding said bar for movement laterally to said laybeam, and means for moving said bar with respect to said laybeam during the movement of the laybeam, said last-named means including a cam and roller operatively associated with said bar and a stationary part of said loom.

40. In combination, a weft-inserting pilot in the form of an elongated body substantially rectangular in cross-section and having tapering ends, means for seizing a weft for carriage across a loom, said seizing means including a pin slidably mounted adjacent to each of the ends of said pilot, each of said pins having an end exposed at one side of said pilot and an enlarged head adapted to be seated against the opposite side of said pilot, and resilient means normally pressing the heads of said pins into contact with said pilot.

41. In a loom having mechanism for reciprocating a laybeam, the combination comprising a laybeam, a weft-inserting pilot in the form of an elongated body substantially rectangular in cross-section and having tapering ends, thread-seizing means mounted adjacent to each of the ends of said pilot, each of said means being partly exposed at opposite sides of said pilot and having an element at one side of the pilot for engaging a weft disposed across the path of travel of said pilot, resilient means normally retaining said weft-seizing element close to the side of the pilot, means for propelling said pilot for travel across the loom, means operable in timed relation to the movement of said laybeam for actuating said propelling means, and means controlled by said last-named means for causing said weft-engaging element to engage a weft end as said pilot is propelled from said propelling device.

42. In a loom having mechanism for reciprocating a laybeam, the combination comprising a laybeam, a weft-inserting pilot in the form of an elongated body substantially rectangular in cross-section and having tapering ends, a pin slidably mounted adjacent to each of the ends of said pilot, each of said pins having an end exposed at one side of said pilot and an enlarged head adapted to be seated against the opposite side of said pilot, resilient means normally pressing the heads of said pins into contact with said pilot, means for propelling said pilot for travel across the loom, means operable in timed relation to the movement of said laybeam for actuating said propelling means, and means actuated by said last-named means for momentarily lifting and releasing one of said pins to the action of its associated spring whereby to seize a weft disposed across the path of travel of said pilot from said propelling device.

43. In a loom for weaving cloth, a frame, a laybeam for movement toward and away from the cloth, a pilot having a thread gripper adjacent each end, a guideway on the laybeam for guiding the pilot to and fro across the loom, a pilot-projecting unit mounted adjacent each end of the laybeam for projecting and catching the pilot, a filler thread supply adjacent each end of the laybeam, a thread-holding device on each end of the laybeam adjacent the discharge end of the respective units for holding the severed supply end of the filler thread, leading from its corresponding supply, in position to be engaged by the trailing gripper of the pilot as the pilot is projected from one or the other of said units, cutting devices at each side of the loom adjacent the discharge ends of their respective units, said cutting devices severing the leading end of the filler thread after insertion in the shed, said cutting devices also positioning the trailing portion of the filler thread, after insertion in the shed, in the adjacent thread-holding device and severing the filler thread between the cloth and the said holding device.

44. In a loom for weaving cloth, a frame, a laybeam for reciprocating movement toward and away from the cloth, a pilot having a thread-gripper, a guideway on said laybeam for guiding said pilot to and fro across the loom, a pilot-projecting unit at each end of the laybeam for projecting and catching said pilot, each unit comprising a projector, a cocking member, a pilot-stopping device, a selector gate and an operating member; said cocking members engaging said frame at the front end of the loom to cock the uncocked unit, the other unit being cocked from a previous cycle and containing the pilot, said pilot and units having cooperating means to open the gate of the unit in which the pilot happens to be located, the gate of the other unit being closed; trigger fingers at the back end of the loom engageable by said operating members, the operating member of the empty unit being rendered ineffective by the closed gate of said empty unit, the operating member of the loaded unit serving to discharge the unit and rendering its stopping device inoperative, the stopping device of the unloaded unit being operative to receive and hold the pilot shot from said loaded unit.

45. In a loom having mechanism for reciprocating a laybeam, the combination comprising a laybeam, a pilot, a pilot-projecting device at each end of said laybeam, each device comprising a pilot-projector, means for cocking said projector, a latch, means for actuating said cocking means, means for tripping said latch to release said projector, means for actuating said tripping means, and means controlled by a pilot for permitting said latch-tripping means to be actuated to trip said latch.

46. In a loom having mechanism for reciprocating a laybeam, the combination comprising a laybeam, a pilot, a pilot-projecting device at each end of said laybeam, each device comprising a pilot-projector, means for cocking said projector, a latch, means for actuating said cocking means, means for tripping said latch to release said projector, means for actuating said tripping means, and means for preventing said tripping means from tripping said latch, said last-named means being controlled by said pilot to permit said tripping means to trip said latch.

47. In a loom having mechanism for reciprocating a laybeam, the combination comprising a laybeam, a pilot, a pilot projecting device at each end of said laybeam, each device comprising a pilot-projector, means for cocking said projector, a latch, means for actuating said cocking means as said laybeam moves forwardly, means for tripping said latch to release said projector, means for actuating said tripping means, means controlled by a pilot for permitting said tripping means to trip said latch, and means for pushing said pilot inward of said projecting device at each end of said laybeam to assure that the pilot is in position to control said pilot-controlled means.

48. In a loom having mechanism for reciprocating a laybeam, the combination comprising a laybeam, a pilot, a pilot projecting device at each end of said laybeam, each device comprising a pilot-projector, means for cocking said projector, a latch, a device mounted on a stationary part of said loom for actuating said cocking means as said laybeam moves forwardly, means for tripping said latch to release said projector, means mounted on a stationary part of said loom for actuating said tripping means as said laybeam moves rearwardly, and means controlled by a pilot for permitting said tripping means to trip said latch when said pilot is in proper position for projection by said projector.

49. In a loom having mechanism for reciprocating a laybeam, the combination comprising a laybeam, a pilot, a pilot projecting device at each end of said laybeam, each device comprising a pilot-projector, means for cocking said projector, a latch, a device for actuating said cocking means as said laybeam moves forwardly, means for tripping said latch to release said projector, means for actuating said tripping means as said laybeam moves rearwardly, and means for preventing said tripping means from tripping said latch as said laybeam moves rearwardly, said last-named means being controlled by said pilot to permit said tripping means to trip said latch as said laybeam moves rearwardly when said pilot is in proper position with respect to said projector.

50. In a loom having mechanism for reciprocating a laybeam, the combination comprising a laybeam, a pilot, a pilot projecting device at each end of said laybeam, each device having a box with a channel therein for receiving said pilot and a spring-pressed plunger, means for cocking said plunger, a latch, means for actuating said cocking means to cock said plunger, means for tripping said latch to release said plunger, means for rendering said latch-tripping means ineffective to trip said latch unless said pilot is in said box in position for projection by said plunger and to permit said latch-tripping means to trip said latch and release said plunger when said pilot is in said box in position for projection by said plunger, and resilient means for arresting the travel of said plunger after projecting said pilot.

51. In a loom having mechanism for reciprocating a laybeam, the combination comprising a laybeam, a pilot, a pilot projecting device at each end of said laybeam, each device having a box with a channel therein for receiving said pilot and a spring-pressed plunger, a latch, cocking means for said plunger, spring means for retracting said cocking means from cocking position, means for actuating said cocking means to cocking position as said laybeam moves forwardly, means for tripping said latch to release said plunger as said laybeam moves rearwardly, means for rendering said latch-tripping means ineffective to trip said latch unless said pilot is in said box in positon for projection by said plunger, and means controlled by said pilot to permit said tripping means to trip said latch and release said plunger when said pilot is in said box in position for projecton by said plunger.

52. In a loom having mechanism for reciprocating a laybeam, the combination comprising a laybeam, a pilot, a pilot projecting device at each end of said laybeam, each device having a box with a channel therein for receiving said pilot and a spring-pressed plunger, a latch, means for cocking said plunger, spring means for retracting said cocking means from cocking position, means for actuating said cocking means to cock said plunger, said actuating means including members mounted on said laybeam and on a stationary part of said loom and cooperating together by the forward movement of the laybeam, means for tripping said latch to release said plunger, said latch-tripping means including members mounted on said laybeam and on a stationary part of said loom and cooperating together by the rearward movement of the laybeam, means for rendering said latch-tripping means ineffective to trip said latch unless said pilot is in said box in position for projection by said plunger, and means controlled by said pilot to permit said latch-tripping means to trip said latch when said pilot is in said box in position for projection by said plunger.

53. In a loom having mechanism for reciprocating a laybeam, the combination comprising a laybeam, a pilot, a pilot projecting device at each end of said laybeam, each device having a box with a channel therein for receiving said pilot and a spring-pressed plunger, a latch, cocking means for said plunger, spring means for retracting said cocking means from cocking position, means for actuating said cocking means to cocking position, said actuating means including members mounted on said laybeam and on a stationary part of said loom, means for tripping said latch to release said plunger as said laybeam moves rearwardly, said latch-tripping means including members mounted on said laybeam and mounted on a stationary part of said loom, means controlled by said pilot to permit said latch-tripping means to trip said latch to release said plunger when said pilot is in said box in position for projection by said plunger, and means for absorbing the impact of said plunger after projecting said pilot.

54. In a loom having mechanism for reciprocating a laybeam, the combination comprising a laybeam, a pilot, a pilot-projecting device at each end of said laybeam, each device comprising a pilot projector for projecting said pilot alternately lengthwise of said laybeam, a shipper lever for controlling the reciprocation of said laybeam, means for holding said shipper lever in position for the continuous operation of said laybeam, electrically operable means for actuating said holding means to release said shipper lever to stop said laybeam, a circuit for actuating said electrically operable means, means adapted to make contact with said pilot when it is in either of said devices, switch means in said circuit controlled by said pilot-contacting means for controlling said circuit to cause the release of said shipper means when said pilot is not present in either one of said pilot projecting devices, a switch in said circuit, and means carried by said laybeam for operating said switch to control said circuit to prevent stopping of said laybeam while the pilot is in flight between said projecting devices.

55. In a loom having mechanism for reciprocating a laybeam, the combination comprising a laybeam, a pilot for carrying a filling thread from end to end of said laybeam, means for projecting said pilot lengthwise of said laybeam, a shipper lever for controlling the reciprocation of said laybeam, means for holding said shipper lever in position for the continuous operation of said laybeam, electrically operable means for actuating said holding means to release said shipper lever to stop said laybeam, a circuit for actuating said electrically operable means, means for detecting the breaking of a filling thread carried by said pilot, said detecting means comprising a spring-pressed finger for contacting a filling thread carried by said pilot, means controlled by said laybeam for withdrawing said finger from operative position during a portion of a movement of the laybeam and for releasing said finger to contact said filling thread during another portion of a movement of the laybeam, and switch means in said circuit controlled by said finger for controlling said circuit to cause the release of said shipper means when a filling thread fails to be carried by said pilot.

56. In a loom having mechanism for reciprocating a laybeam, the combination comprising a laybeam, a pilot projecting device mounted on said laybeam adjacent each end of the laybeam, a pressure sensitive finger pivotally mounted on said laybeam for contacting a filling thread carried by a pilot from one projecting device to the other, means carried by the laybeam for holding said finger in inoperative position during a portion of a swinging movement of said laybeam, stationary means mounted on the loom and engageable with said holding means to release said finger to operative position for contacting a filling thread in a shed as the laybeam moves in one direction and to actuate said holding means to restore said finger to inoperative position as the laybeam moves in the opposite direction, and means controlled by said finger for stopping the movement of the laybeam whenever said finger fails to contact a filling thread after said finger has been released from inoperative position.

57. In a loom having mechanism for reciprocating a laybeam, the combination comprising a laybeam, means mounted adjacent each end of the laybeam for intermittently projecting and receiving a pilot carrying a filling thread through a shed, a shipper lever for controlling the reciprocation of said laybeam, means for releasing said shipper lever to stop said laybeam, said releasing means including an arm mounted on said laybeam and movable between an operative position in which the arm may make contact with a filling thread extending through a shed and an inoperative position, means actuated by the movement of the laybeam in one direction for releasing said arm to operative position for contacting a filling thread and actuated by the movement of the laybeam in the opposite direction for setting said arm in inoperative position, and an electrical circuit operable by said finger to actuate said shipper lever-releasing means to release said shipper lever to stop said laybeam when said finger fails to contact a filling thread in the shed after it has been released from inoperative position.

58. In a loom having mechanism for reciprocating a laybeam, the combination comprising a laybeam, a pilot projecting device mounted adjacent each end of said laybeam, each device comprising a pilot projector and means for cocking and holding said pilot projector in cocked position, means carried on said laybeam for guiding a pilot from one projecting device to the other, said pilot guiding means being movable between a position for guiding a pilot through a shed and a position below the shed during the swinging of the laybeam, means operable in timed relation to the movement of the laybeam for selectively releasing a pilot from one or the other of said pilot-projecting devices when said pilot-guiding means are within a shed, pressure sensitive means mounted on said laybeam for contacting a filling thread carried through a shed, means controlled by said filling thread contacting means for stopping said laybeam, and means operable in timed relation to the swinging of the laybeam for cutting a filling thread after a pilot has carried the filling thread from one of said pilot projecting devices to the other.

59. In a loom having mechanism for reciprocating a laybeam, the combination comprising a laybeam, a device for projecting a pilot lengthwise of said laybeam, said device including a base member mounted on said laybeam, a spring-actuated plunger movable in said base member for projecting a pilot from said base member, means operable by the movement of the laybeam for cocking said plunger, a latch for holding said plunger in cocked position, means for releasing said latch, means operable by the movement of said laybeam for actuating said latch-releasing means to release said plunger each time said laybeam moves rearwardly, and means operable by a pilot for preventing said latch-releasing means from actuating said latch to release said plunger unless a pilot is in said base member, said last-named means including a member actuated by a pilot located in said base member so that unless a pilot is present in said base member, said latch and plunger are not released as the laybeam moves rearwardly.

60. In a loom, a projecting device for a pilot having thread-gripping means, said device comprising a body member for receiving said pilot, said body member having means for stopping and holding a pilot and means for operating the thread-gripping means of said pilot to release a thread therefrom, a spring-tensioned plunger slidable in said body member for projecting a pilot from said body member, cocking means for cocking said plunger, and tripping means for engaging and releasing said plunger to project a pilot.

References Cited in the file of this patent

UNITED STATES PATENTS

| | | |
|---|---|---|
| 1,034,275 | Miller | July 30, 1912 |
| 1,410,518 | Smith | Mar. 21, 1922 |
| 1,960,988 | Carroll | May 29, 1934 |
| 2,148,700 | Lohsse | Feb. 28, 1939 |
| 2,160,339 | Moessinger | May 30, 1939 |
| 2,172,615 | Kennedy | Sept. 12, 1939 |
| 2,271,205 | Pfarrwaller | Jan. 27, 1942 |
| 2,316,703 | Moessinger | Apr. 13, 1943 |
| 2,499,887 | Sullivan et al. | Mar. 7, 1950 |
| 2,538,798 | Pfarrwaller | Jan. 23, 1951 |
| 2,586,311 | Dion | Feb. 19, 1952 |
| 2,600,667 | Mason | June 17, 1952 |

FOREIGN PATENTS

| | | |
|---|---|---|
| 476,058 | Germany | May 10, 1929 |
| 623,735 | Great Britain | May 23, 1949 |